US011259161B2

(12) United States Patent
Prabhakar et al.

(10) Patent No.: US 11,259,161 B2
(45) Date of Patent: Feb. 22, 2022

(54) ENHANCEMENTS FOR RADIO ACCESS CAPABILITY SIGNALING (RACS)

(71) Applicant: Apple Inc., Cupertino, CA (US)

(72) Inventors: Alosious Pradeep Prabhakar, Singapore (SG); Mohammed Sadique, Parramatta (AU); Vijay Venkataraman, San Jose, CA (US); Krisztian Kiss, Hayward, CA (US); Jordi Agud Ruiz, Meguro-ku (JP); Yip Pong Herbert Wong, Hong Kong (HK); Kok Yin Chan, Hornsby (AU); Srinivasan Nimmala, San Jose, CA (US); Lakshmi N. Kavuri, Cupertino, CA (US); Yifan Zhu, San Jose, CA (US); Utkarsh Kumar, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/027,534

(22) Filed: Sep. 21, 2020

(65) Prior Publication Data

US 2021/0105596 A1   Apr. 8, 2021

Related U.S. Application Data

(60) Provisional application No. 62/909,938, filed on Oct. 3, 2019.

(51) Int. Cl.
*H04W 8/24* (2009.01)
*H04L 29/08* (2006.01)
(Continued)

(52) U.S. Cl.
CPC ............... *H04W 4/50* (2018.02); *H04W 8/22* (2013.01)

(58) Field of Classification Search
CPC ......... H04W 4/50; H04W 8/22; H04W 8/245; H04W 60/00; H04W 60/04; H04W 74/002; H04L 67/34
See application file for complete search history.

(56) References Cited

U.S. PATENT DOCUMENTS 9,210,631 B2   12/2015  Hsu
2004/0237081 A1   1/2004  Homiller
(Continued)

FOREIGN PATENT DOCUMENTS

WO   2018132047 A1   12/2017

OTHER PUBLICATIONS

Partial European Search Report for EP 20199514.9-1213, dated Mar. 5, 2021, 13 pages.
(Continued)

*Primary Examiner* — Joseph E Dean, Jr.
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE), manufacturer server, and/or cellular network to perform radio capability signaling. A new type of UE radio capability identifier is provided which may allow a network to distinguish between similar UEs that have or have not implemented a capability update. In order to perform a forced capability update, a manufacturer may issue information about the update to a cellular network (and receive acknowledgement of the information) prior to pushing the update to UEs. In response to an unforced capability update, a cellular network may maintain multiple UE radio capability identifiers for similar UEs which have or have not implemented the update.

(Continued)

A UE radio capability identifier may be adjusted dynamically in response to temporary changes in the UE's capability.

20 Claims, 20 Drawing Sheets

(51) Int. Cl.
  *H04W 74/00* (2009.01)
  *H04W 4/50* (2018.01)
  *H04W 8/22* (2009.01)

(56) References Cited

U.S. PATENT DOCUMENTS

2012/0329478 A1* 12/2012 Lee .................. H04W 8/04
                                                          455/456.1
2017/0251516 A1   8/2017 Bangolae et al.
2019/0313239 A1* 10/2019 Horn ................. H04L 5/14

OTHER PUBLICATIONS

Nokia et al. "Switching and coexistence between PLMN assigned and UE manufacturer assigned UE Radio Capability IDs", 3GPP TSG-SA WG2 Meeting #134, S2-1907826, Sapporo, Japan, Jun. 24, 2019, 4 pages.

\* cited by examiner

ENHANCEMENTS FOR RADIO ACCESS CAPABILITY SIGNALING (RACS)

PRIORITY CLAIM

This application claims priority to U.S. provisional patent application Ser. No. 62/909,938, entitled "Enhancements for Radio Access Capability Signaling (RACS)," filed Oct. 3, 2019, which is hereby incorporated by reference in its entirety as though fully and completely set forth herein.

TECHNICAL FIELD

The present application relates to wireless devices, and more particularly to apparatuses, systems, and methods for managing radio access capability signaling (RACS).

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services.

In some instances, radio access capability signaling (RACS) may be used to describe changes in a UE's capabilities for various reasons. However, some changes in capabilities may not be accurately or efficiently described using existing techniques. Accordingly, improvements in the field may be desired.

SUMMARY

Techniques, apparatuses, systems, and methods are disclosed for a user equipment device (UE), manufacturer server, and cellular network to exchange information about UE capabilities, e.g., using radio access capability signaling (RACS).

In some embodiments, a manufacturer server may receive UE radio configuration information. The server may create a corresponding UE radio capability Identifier (ID) and transmit the ID to one or more networks. The server may push (e.g., transmit) the radio configuration to one or more UEs.

In some embodiments, a manufacturer server may receive UE radio configuration information. The server may request a dictionary entry (e.g., a dictionary entry in a data base of UE radio configuration information and capabilities, including UE radio capability IDs) and receive confirmation of the dictionary entry. The server may transmit a forced update to one or more UEs and implement a corresponding UE radio capability ID.

In some embodiments, a network may receive a registration from a UE and determine a UE radio capability ID. The network may create a new UE radio capability ID associated with a capability update and transmit the update to one or more UEs. The network may receive updated registration based on the capability update from a subset of the one or more UEs. The network may maintain distinct UE radio capability IDs for UEs which have and have not implemented the update.

In some embodiments, a UE may register with a network and later determine to operate at a reduced capability. The UE may update the registration and may later revert to its full capability.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
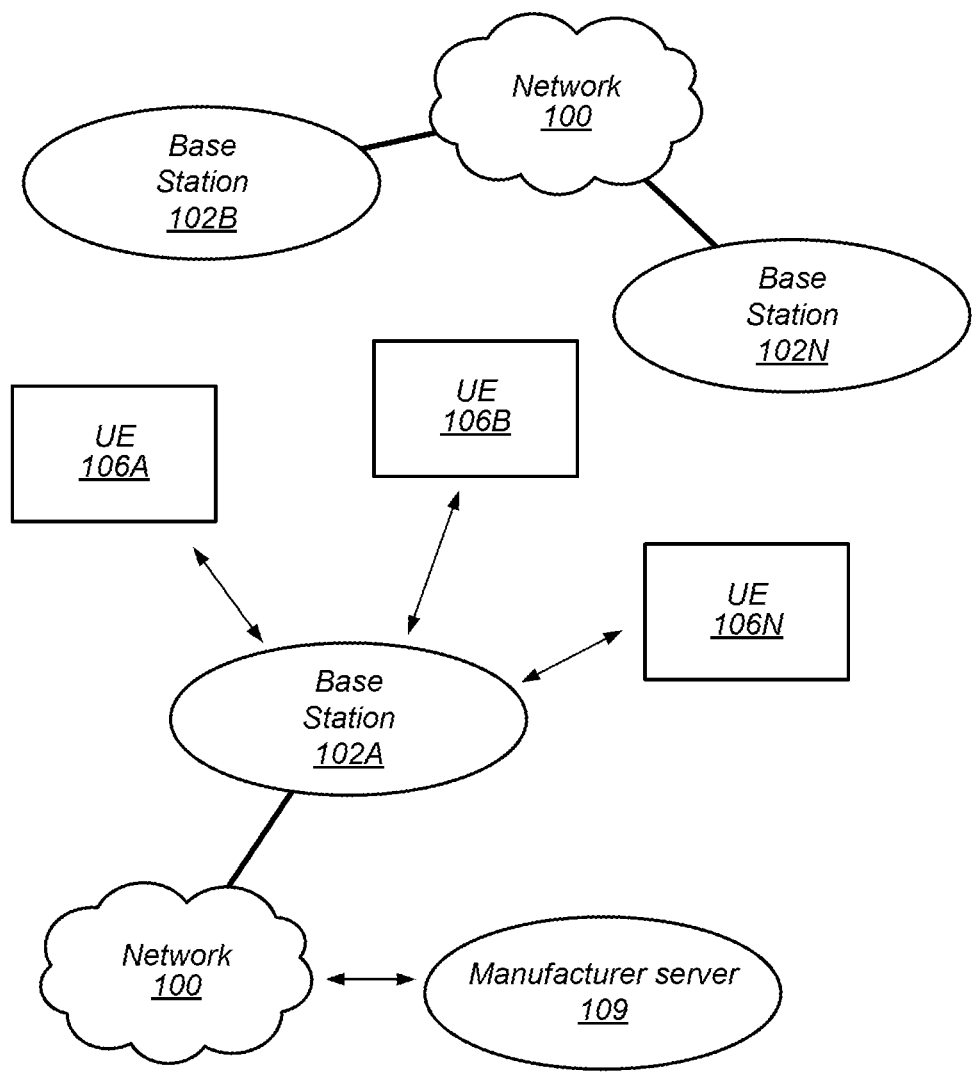
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms may be used in the present Patent Application:
  UE: User Equipment
  BS: Base Station
  ENB: eNodeB (Base Station)
  LTE: Long Term Evolution
  VoLTE: voice over LTE
  UMTS: Universal Mobile Telecommunications System
  RAT: Radio Access Technology
  RAN: Radio Access Network
  E-UTRAN: Evolved UMTS Terrestrial RAN
  CN: Core Network
  EPC: Evolved Packet Core
  MME: Mobile Management Entity
  HSS: Home Subscriber Server
  SGW: Serving Gateway
  PS: Packet-Switched
  CS: Circuit-Switched
  EPS: Evolved Packet-Switched System
  RRC: Radio Resource Control
  IE: Information Element
  UL: uplink
  DL: downlink
  RS: reference signal
  RACS: Radio Access Capability Signaling
  PLMN: Public Land Mobile Network
  UCMF: UE radio Capability Management Function
  Application Function (AF)
  Access and Mobility Management Function (AMF)
  Type allocation code (TAC)
  Serial number (SNR)
  software version number (SVN)
  Network Exposure Function (NEF)
  Network Data Analytics Function (NWDAF)
  discontinuous reception (DRX)
  international mobile equipment identity and software version number (IMEISV)

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™ Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
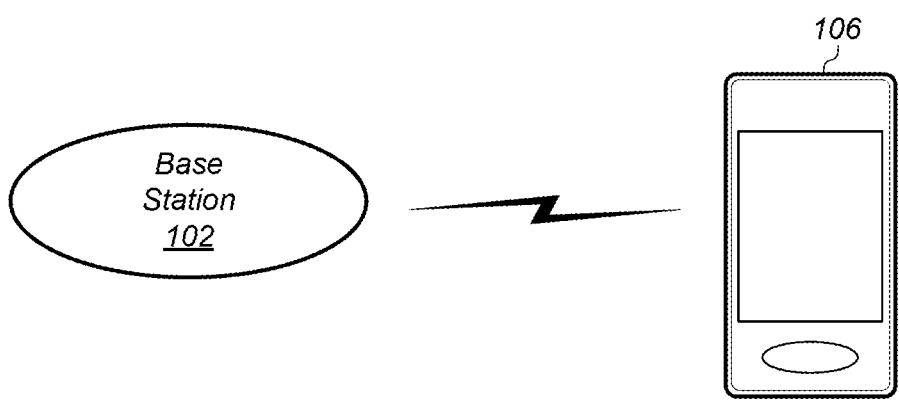
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

The network 100 and/or UE 106 may also communicate with a server 109 associated with a UE manufacturer. The manufacturer server 109 may provide software and/or capability updates to the UE 106. Similarly, the manufacturer server 109 may provide information about such updates to the network 100. For example, the manufacturer server 109 may provide identifying information associated with the UE 106 and/or an update to the UE and/or network.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
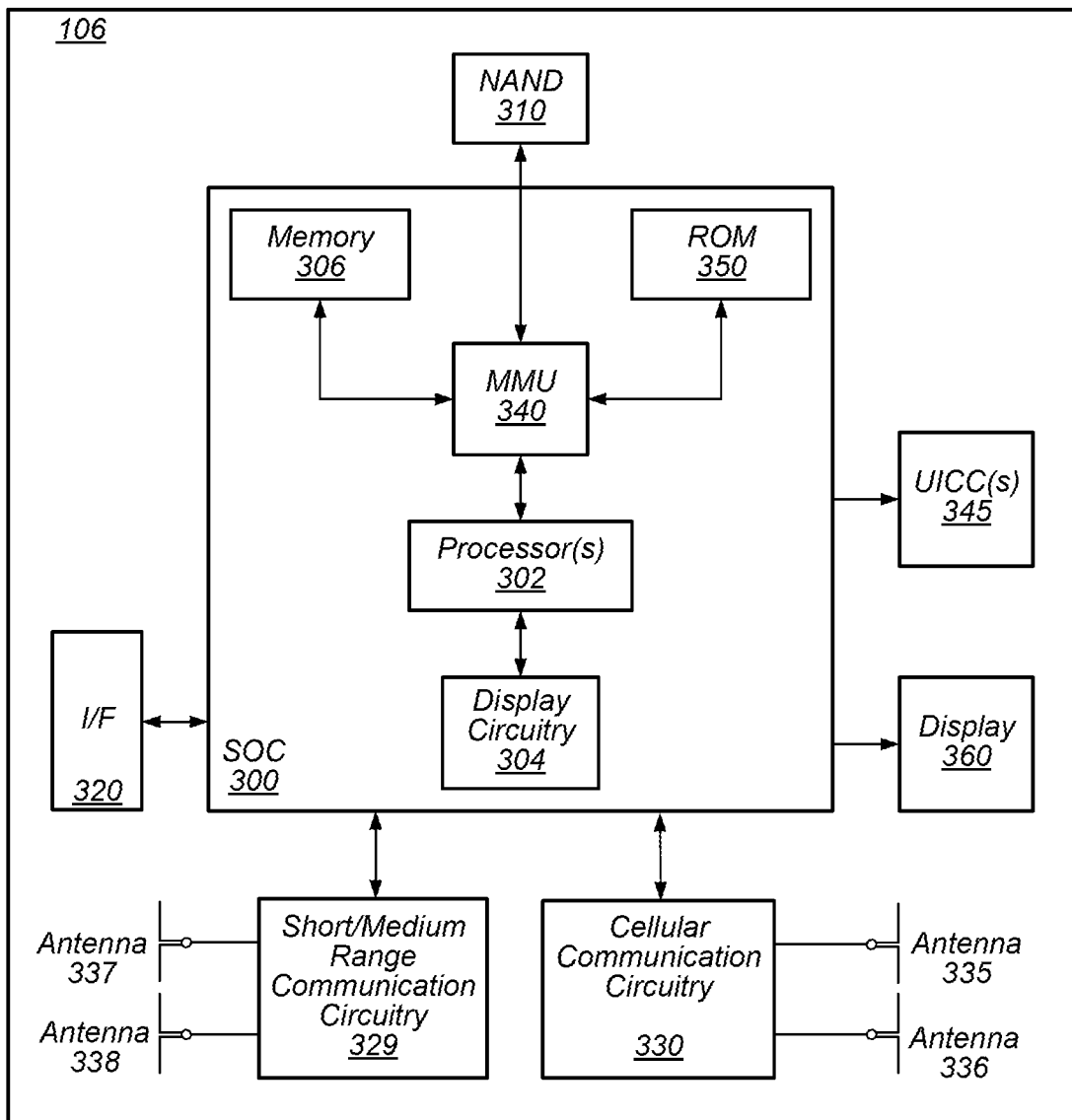
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
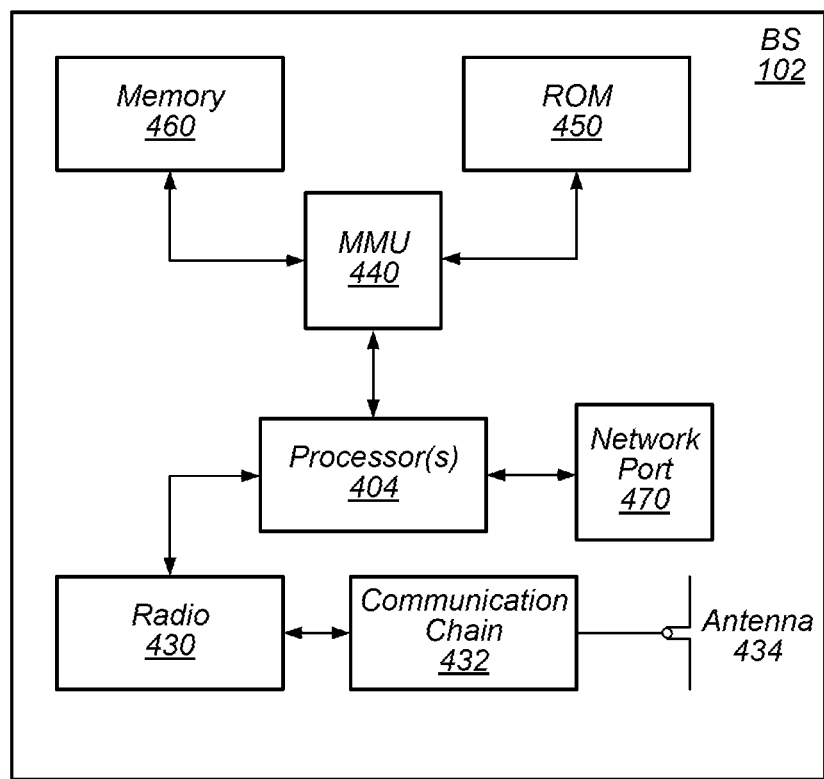
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The radio 430 and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
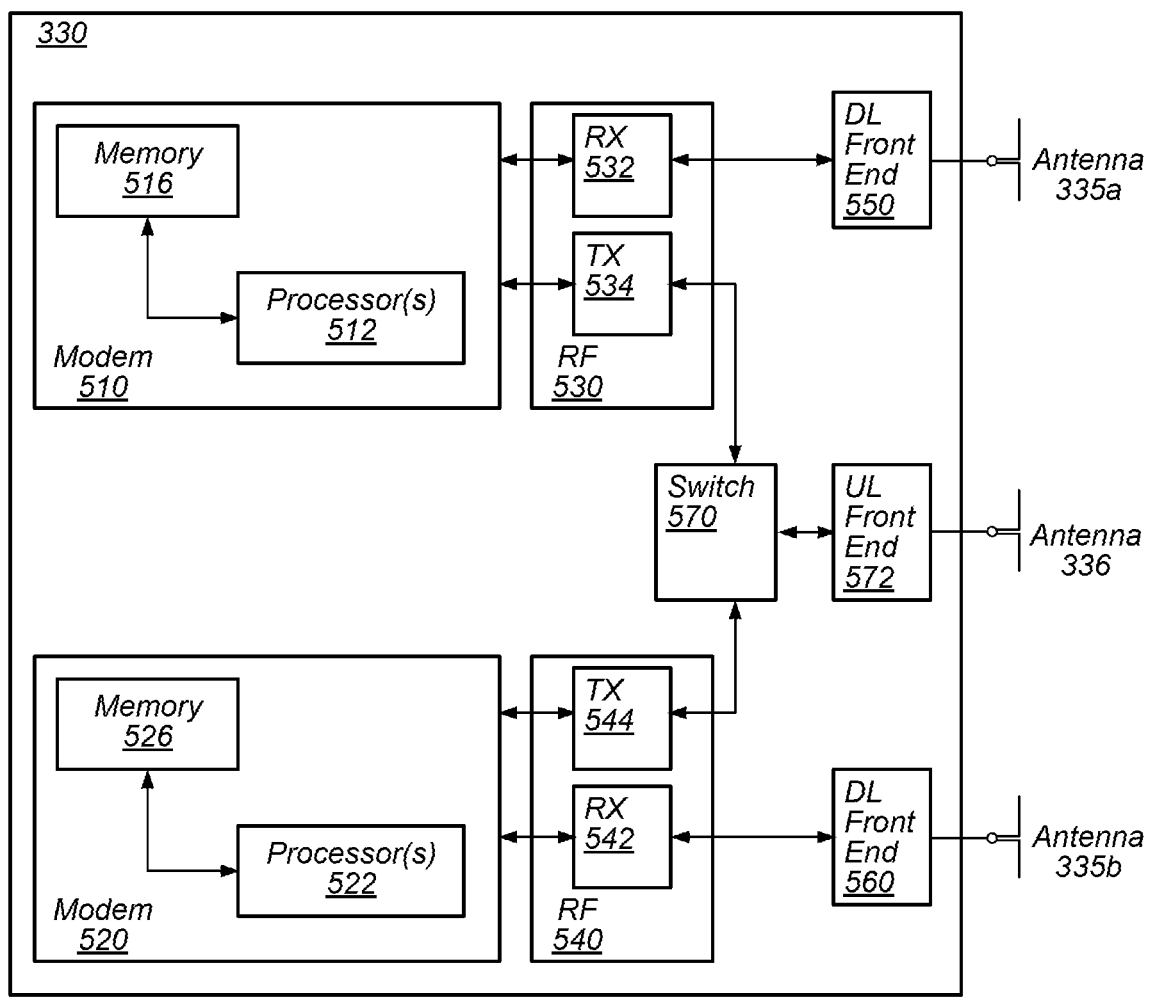
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch (e.g., and/or combiner, multiplexer, etc.) 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, modem 510 and modem 520 may be configured to transmit at the same time, receive at the same time, and/or transmit and receive at the same time. Thus, when cellular communication circuitry 330 receives instructions to transmit according to both the first RAT (e.g., as supported via modem 510) and the second RAT (e.g., as supported via modem 520), combiner 570 may be switched to a third state that allows modems 510 and 520 to transmit signals according to the first and second RATs (e.g., via a transmit circuitry 534 and 544 and UL front end 572). In other words, the modems may coordinate communication activity, and each may perform transmit and/or receive functions at any time, as desired.

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
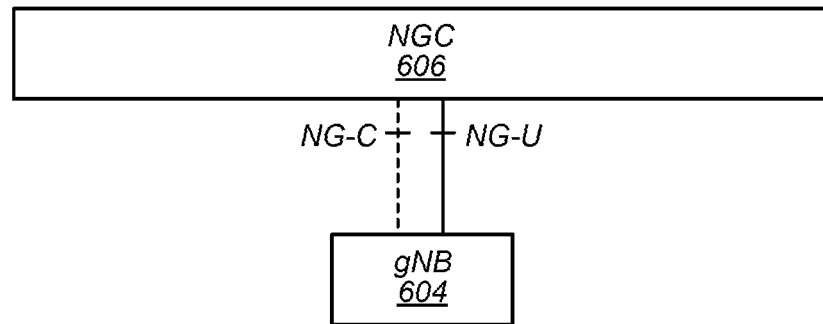
FIGS. 6 and 7 illustrate examples of a 5G NR base station (gNB), according to some embodiments.
Figure 7:
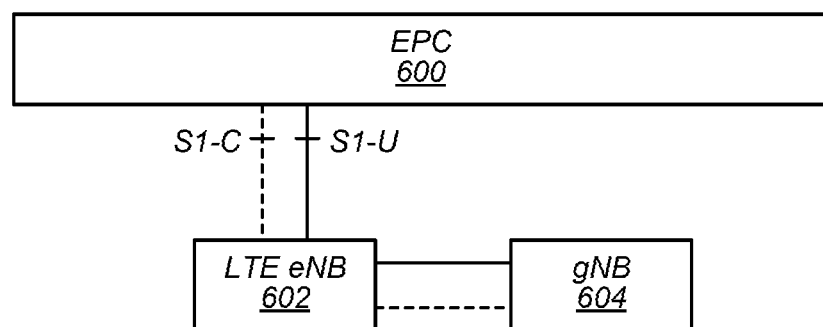

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604)

and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
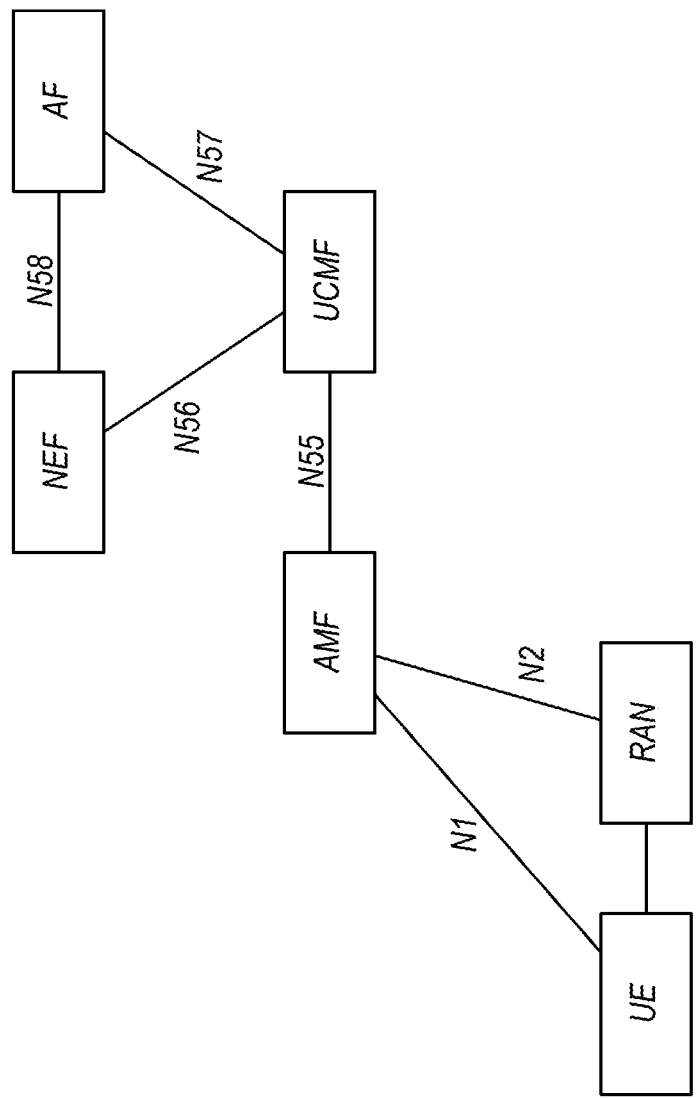
FIGS. 8 and 9 illustrate example aspects of network architecture, according to some embodiments.
Figure 9:
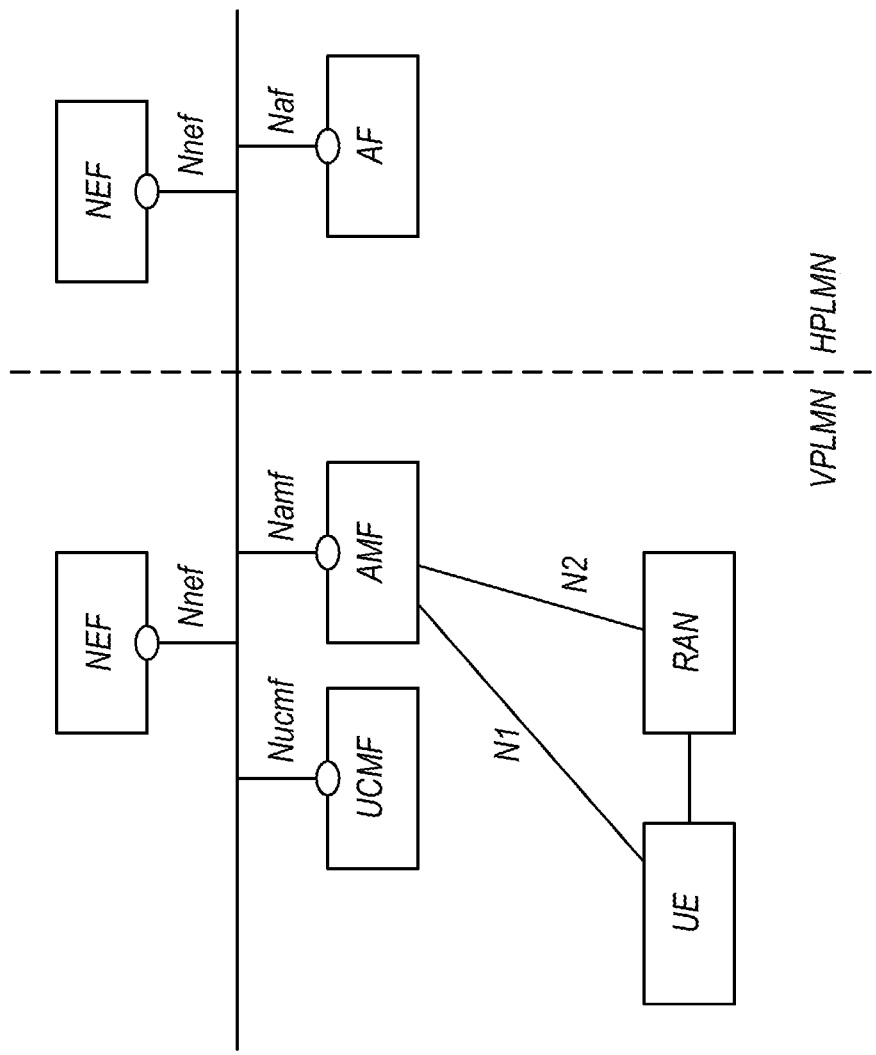

FIGS. 8-9—Radio Capability Signaling

Modern wireless communication systems, e.g., cellular systems such as 5G NR, may allow for a UE (e.g., UE 106) and a base station (e.g., BS 102) to exchange various types of signals and data such as application data and control information. One type of control information may be radio access capability signaling (RACS). RACS may indicate various information about the capabilities of the UE, e.g., related to performing communication on various frequencies or combinations of frequencies, beamforming capabilities, communicating using various multiple-in-multiple-out (MIMO) techniques, VoLTE enablement, eDRX support, FDD and/or TDD enablement, etc. RACS is described in various technical standards, such as 3GPP TS 23.501 v16.1.0, clause 5.4.4.1a, titled UE radio capability signaling optimisation (RACS).

With the increase of the size of UE radio capabilities driven e.g. by additional frequency bands and combinations thereof for E-UTRA and NR, an efficient approach to signal RACS information over the radio interface and other network interfaces is beneficial. One approach may be defined with RACS. RACS may work by assigning an identifier to represent a set of UE radio capabilities. This identifier is called UE radio capability ID. A UE radio capability ID may be either UE manufacturer assigned or PLMN-assigned, e.g., as specified in clause 5.9.10 of 3GPP 23.501. The UE radio capability ID is an alternative to the signaling of the radio capabilities container (e.g., transmitting data on the UE radio capabilities) over the radio interface, within next generation RAN (NG-RAN), from NG-RAN to E-UTRAN, from Access and Mobility Management Function (AMF) to NG-RAN and between core network (CN) nodes supporting RACS. Note that a UE radio capability ID may be shared by any number of individual UEs which have the same radio capabilities. Typically, the UEs that share a UE radio capability ID may be of the same model.

A PLMN-assigned UE radio capability ID may be assigned to the UE using the UE Configuration Update procedure, or Registration Accept, e.g., as defined in 3GPP TS 23.502, according to some embodiments. The UCMF (UE radio Capability Management Function) may store all UE radio capability ID (e.g., PLMN-assigned and/or manufacturer-assigned) mappings in a PLMN. The UCMF may also assign PLMN-assigned UE radio capability IDs (see clause 6.2.21 of 3GPP TS 23.501).

3GPP TS 23.501 v16.1.0, clause 5.9.10 describes the UE radio capability ID. The UE radio capability ID may be a short pointer with format defined in 3GPP TS 23.003 that may be used to uniquely identify a set of UE Radio Capabilities. The UE radio capability ID may be assigned either by the serving PLMN or by the UE manufacturer, as follows:

Manufacturer-assigned: In some embodiments, the UE radio capability ID may be assigned by the UE manufacturer in which case it may be accompanied with the UE manufacturer information (e.g. TAC field in the PEI). In this case, the UE radio capability ID may uniquely identify a set of UE Radio Capabilities for this manufacturer, and together with this UE manufacturer information may uniquely identify this set of UE Radio Capabilities in any PLMN.

PLMN-assigned: In some embodiments, if a manufacturer-assigned UE radio capability ID is not used by the UE or the serving network, or it is not recognized by the serving PLMN UCMF, the UCMF may allocate UE radio capability IDs for the UE. UE radio capability IDs may correspond to different sets of UE radio capabilities that the PLMN may receive from the UE (e.g., or other similar UEs), e.g., at different times. In this case, the UE radio capability IDs the UE receives are applicable to the serving PLMN and may uniquely identify the corresponding sets of UE Radio Capabilities in this PLMN.

The type of UE radio capability ID (e.g., manufacturer-assigned or PLMN-assigned) may be distinguished when a UE radio capability ID is signaled.

3GPP TS 23.501 v16.1.0, clause 6.2.21 describes aspects of the UE radio Capability Management Function (UCMF). The UCMF may be used for storage of dictionary entries corresponding to PLMN-assigned and/or Manufacturer-assigned UE radio capability IDs. An AMF may subscribe with the UCMF to obtain from the UCMF new values of UE radio capability ID that the UCMF assigns for the purpose of caching them locally. Provisioning of Manufacturer-assigned UE radio capability ID entries in the UCMF may be performed from an AF that interacts with the UCMF either directly or via the network exposure function (NEF) (or via Network Management) using a procedure, e.g., as defined in 3GPP TS 23.502.

For PLMN-assigned UE radio capability ID, the UCMF may also be the function that assigns the UE radio capability ID values to the UE. Each PLMN-assigned UE radio capability ID may also be associated to the type allocation code (TAC) and software version (SV) (e.g., software version number (SVN)) of the UE model that it is related to. When an AMF requests the UCMF to assign a UE radio capability ID for a set of UE Radio Capabilities, the AMF may indicate the TAC and SV of the UE that the UE Radio Capabilities are related to.

| Service Name | Description | Reference in Technical Specification 23.502 |
|---|---|---|
| Nucmf_Provisioning | Allows the NF consumer to provision a dictionary entry in the UCMF consisting of a Manufacturer-assigned UE radio capability ID and the corresponding UE radio access capability. | 5.2.18.2 |
| Nucmf_UECapabilityManagement | Allows the NF consumer to resolve UE radio capability ID (either Manufacturer-assigned or PLMN- | 5.2.18.3 |

| Service Name | Description | Reference in Technical Specification 23.502 |
|---|---|---|
| | assigned) into the corresponding UE radio access capability. Allows the NF consumer to obtain a PLMN-assigned UE radio capability ID for a specific UE radio access capability. Allows the NF consumer to subscribe or unsubscribe for notifications of UCMF dictionary entries. Allows the NF consumer to be notified about creation and deletion of UCMF dictionary entries. | |

FIG. 8 illustrates radio capability signaling architecture, according to some embodiments. As shown, N55 may be the Reference point between AMF and the UCMF, N56 may be the Reference point between NEF and the UCMF, and N57 may be the reference point between AF and the UCMF.

FIG. 9 illustrates roaming architecture for RACS, according to some embodiments. As shown, a UE on a visited PLMN (VPLMN) may communicate with the RAN of the VPLMN. Among various connections, an AMF of the VPLMN may communicate with a UCMF of the VPLMN and an AF of the UE's home PLMN (HPLMN).

| Service Name | Service Operations | Operation Semantics | Example Consumer(s) |
|---|---|---|---|
| Nucmf_Provisioning | Create | Request/Response | AF, NEF |
| | Delete | Request/Response | AF, NEF |
| Nucmf_UECapabilityManagement | Resolve | Request/Response | AMF |
| | Assign | Request/Response | AMF |
| | Subscribe | Subscribe/Notify | AMF |
| | Unsubscribe | Subscribe/Notify | AMF |
| | Notify | Subscribe/Notify | AMF |

| Service Name | Service Operations | Operation Semantics | Example Consumer(s) |
|---|---|---|---|
| Naf_EventExposure | Subscribe | Subscribe/Notify | NEF, NWDAF |
| | Unsubscribe | | NEF, NWDAF |
| | Notify | | NEF, NWDAF |

In order to be able to interpret the UE radio capability ID a NF or node may store a local copy of the mapping between the UE radio capability ID and its corresponding UE Radio Access Capabilities information, e.g., a dictionary entry. When no mapping is available between a UE radio capability ID and the corresponding UE radio capability information in a Network Function or node, this Network Function or node may retrieve this mapping from the UCMF and store it.

An AMF which supports RACS may store such UE radio capability ID mapping for all the UEs that it serves that have a UE radio capability ID assigned (e.g., and possibly additional UEs, e.g., which may not be currently served by the AMF). The NG-RAN may perform local caching of the UE Radio Access Capabilities for the UE radio capability IDs for the UEs it is serving, and potentially for other UE radio capability IDs according to suitable local policies. When the NG-RAN needs to retrieve the mapping of a UE radio capability ID to the corresponding UE radio capability information, it may query the AMF using N2 signaling, e.g., defined in Technical Specification 38.413. When the AMF needs to retrieve a (e.g., PLMN-assigned) UE radio capability ID for a UE from the UCMF, it may provide the UE Radio Capabilities Information for the UE. The UCMF may store the association of this IMEI/TAC and SV with this UE radio capability ID. When the AMF retrieves the UE radio capability Information associated to a UE radio capability ID it may provide the UE radio capability ID to UCMF, e.g., in order to obtain a mapping of a UE radio capability ID to the corresponding UE Radio Capabilities information.

Figure 10:
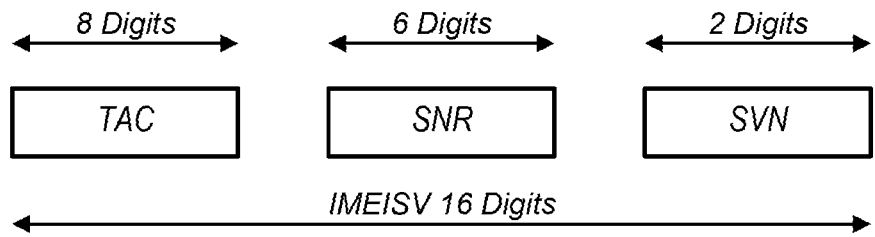
FIG. 10 is a block diagram illustrating aspects of international mobile equipment identity and software version number (IMEISV), according to some embodiments.
Figure 11:
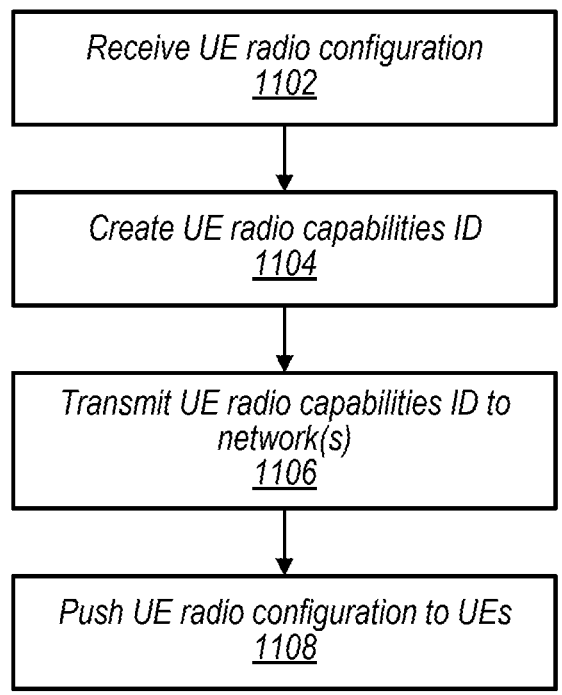
FIG. 11 is flow chart diagram illustrating an example method of using a new UE radio capability ID format, according to some embodiments.
Figure 12:
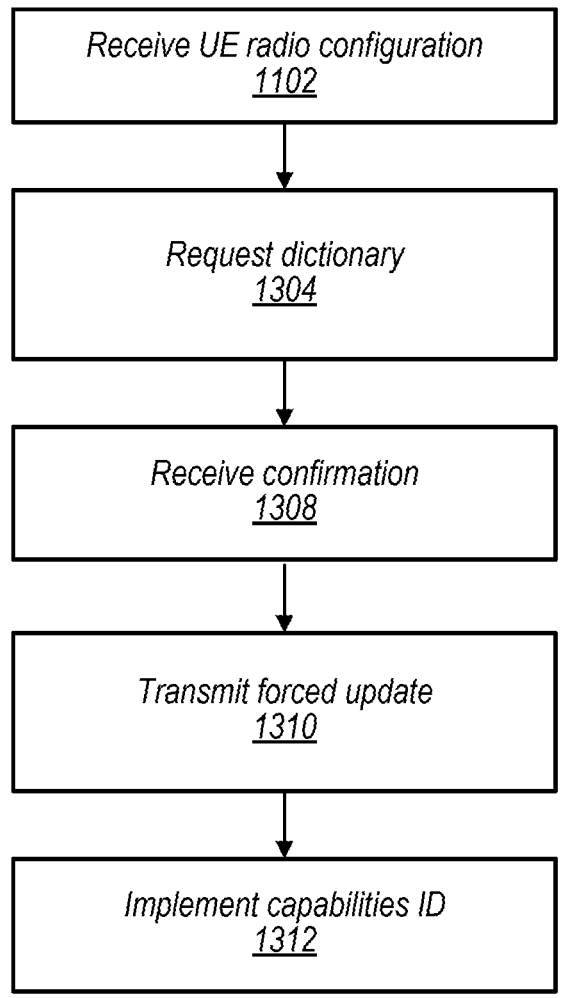
FIG. 12 is flow chart diagram illustrating an example method for forced capability update, according to some embodiments.

FIGS. 10-12—New UE Radio Capability ID Format

As noted above, the existing UE radio capabilities identifier may use TAC and SVN, to uniquely identify the set of UE capabilities to the network, e.g., as shown in FIG. 10, according to some embodiments. An SVN update may not happen when the capabilities are updated via customization (e.g., a capability update, e.g., sometimes referred to as carrier bundle or bundle update). An SVN update may happen when there is a change in the baseband build. Often, new features may be added in the UE for particular carrier via capability update such as VoLTE enablement, eDRX support, FDD and/or TDD enablement, etc. Addition of such new features (e.g., and/or modification of existing features) may changes the UE capabilities without a change in SVN. To meet the specific carrier requirements, frequent addition of bands and carrier aggregation (CA) combos may be done by device manufacturers in bundle/capability update(s). This may lead to change in the UE capabilities without change in SVN.

FIG. 11 is a flow diagram which illustrates exemplary aspects of using a new UE radio capability ID format which may be updated in response to a capability update. Aspects of the method of FIG. 11 may be implemented by a UE 106 in communication with a cellular network (e.g., via a BS 102) and in further communication with a manufacturer server 109, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.), or manufacturer server 109 may cause the UE, base station, network element (s), and/or manufacturer server to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A manufacturer server 109 may receive an updated UE radio configuration, e.g., a capability update, e.g., from an engineering team of the manufacturer (1102), according to some embodiments. The capability update (e.g., updated radio configuration) may be related to performing communication on various frequencies or combinations of frequencies, CA, beamforming capabilities, MIMO, etc. The capability update may be associated with a capability identifier (CI) or the manufacturer server may create an associated CI. The capability update may not change a software version number.

The manufacturer server 109 may create a (e.g., manufacturer created) UE radio capability ID, e.g., based on a CI as TAC+SVN+CI (1104), according to some embodiments. Thus, for any change in the UE capability, e.g., for a particular carrier or PLMN, an updated manufacturer radio UE radio capability ID may be created, according to some embodiments. In other words, the CI field may include sufficient information (e.g., in combination with the TAC and SVN), to uniquely identify set of UE capabilities, including to differentiate between the capabilities of otherwise similar UEs with and without the update. The UE radio capability ID may have the same SVN as a previous UE radio capability ID, e.g., because the updated configuration may not change the SVN.

To create the "CI" field in a UE radio capability ID, a manufacturer may use the existing opcode of the header section format of section 4.1.1 of RFC 1035, e.g., one or more of bits 3-15 indicated as reserved for future use, may be used.

In some scenarios, TAC and SV may not be sufficient to identify the set of UE capabilities. For every 1 million devices, TAC needs to be updated. Thus, for a popular UE model, a different UE radio capability ID may be reserved for the same set of radio capabilities due to change in TAC and SV. Additionally or alternatively, a different UE radio capability ID may be used to replace TAC with a model ID. Model ID may uniquely identify the UE model, e.g., iPhone XS. In some embodiments, a manufacturer-assigned or PLMN-assigned UE radio capability ID may be composed of the following elements model ID, SVN, and CI. It will be appreciated that a model ID may implicitly or explicitly indicate the vendor/manufacturer of the UE. In other words, a vendor identification may be a subset of a model ID, e.g., a model ID may be useable to determine a vendor/manufacturer. A model ID may be referred to as a vendor ID.

The manufacturer server 109 may transmit the created UE radio capability ID and/or associated capability information to one or more elements of the network 100, e.g., a UCMF (1106), according to some embodiments. The network element may create a dictionary entry for the UE radio capability ID and capability information, or otherwise store the ID and associated information locally. It will be appreciated that the manufacturer server 109 may provide to the UCMF and/or other network element(s) any relevant information about the UE radio capability ID and associated information. For example, the manufacturer server may provide a list of TACs for which a UE radio capability ID based on model ID may apply.

The manufacturer server 109 may transmit (e.g., push) the capability update to (e.g., relevant) UEs on the network 100 (1108), according to some embodiments. For example, the server may send the update to all UEs on the network of a certain model (or models) to which the update is targeted. The update may be mandatory (e.g., forced) or it may be optional (e.g., unforced). The server may also provide an indication of the UE radio capability ID, e.g., so that the UE's may use the ID in future communications with the network and/or other networks.

FIGS. 12-16—Updating UE Radio Capability Via a Forced Update

UE radio capabilities may be updated using a forced update (e.g., which all effected UEs must perform at once) or an unforced update (e.g., which may be performed at the discretion of the individual UE and/or user).

When there is a capability update including a radio capabilities change, many UEs may register at once with full radio capabilities, according to some embodiments. This may lead to huge signaling overhead. Similarly, since many the UEs may register with full radio capabilities, this will lead to high load in AMF⇔UCMF interface. Further, the capability update may not update the SVN, hence the (e.g., existing) UE radio capability ID (e.g., TAC+SNR+SVN, model ID+SNR+SVN, TAC+SVN, or model ID+SVN, etc., as illustrated in FIG. 10) may not reflect the UE capability update.

FIG. 12 is a flow diagram which illustrates exemplary aspects of a forced capability update, according to some embodiments. Aspects of the method of FIG. 12 may be implemented by a UE 106 in communication with a cellular network (e.g., via a BS 102) and in further communication with a manufacturer server 109, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor (s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.), or manufacturer server 109 may cause the UE, base station, network element(s), and/or manufacturer server to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A manufacturer server 109 may receive an updated UE radio configuration, e.g., a capability update (e.g., as discussed above with respect to 1102), according to some embodiments. The capability update may be associated with a new manufacturer created UE radio capability ID identifier (e.g., TAC+SVN+CI or model ID+SVN+CI as described with respect to FIG. 11), according to some embodiments. The capability update may be associated with one or more manufacturer and/or PLMN created UE radio capability ID(s) according to prior formats (e.g., as in FIG. 10, e.g., not including CI), according to some embodiments.

The manufacturer server 109 may transmit information about the capability update such as request for a dictionary entry for the capability update (1304), according to some embodiments. For example, the server may transmit a request to one or more network elements and may specify capabilities associated with the capability update and a (e.g., manufacturer-assigned) UE radio capability ID. For example, based on such a request, an AF and/or UCMF may generate a new dictionary based on the capability update and associated UE radio capability ID. The dictionary entry may use a new manufacturer-assigned UE radio capability ID or a new PLMN-assigned UE radio capability ID as the UE radio capability ID, among various possibilities. Thus, the capability update (e.g., the capabilities of UEs that implement the update) and associated UE radio capability ID may be stored on the network and accessible to various network elements. For example, some or all network nodes (e.g., AMF, RAN) may be updated with new UE radio capability ID.

The manufacturer server 109 may receive confirmation from the network 100 that the capability information, e.g., of the capability update is stored (1308), according to some embodiments. For example, once all the nodes are updated, this information is feedback to the manufacturer server via an application function (AF).

The manufacturer server 109 may transmit the forced update to (e.g., all) the relevant UEs with the new capability update and may also provide the new UE radio capability ID (e.g., TAC+SVN+CI or model ID+SVN+CI) (1310), according to some embodiments. The forced update may configure the UEs to implement the forced update, store the new UE radio capability ID, and delete a previous UE radio capability ID. The forced update maybe transmitted in response to the confirmation from the network that the capability update is stored.

The UE(s) 106 and network 100 may implement the capability update and the new UE radio capability ID (1312), according to some embodiments. For example, during baseband refresh, a UE may start using a new manufacturer ID (e.g., TAC+SVN+CI or model ID+SVN+CI, e.g., associated with the capability update). For example, the UE and network may communicate according to the updated capability of the UE, e.g., accounting for the capability update and using the new UE radio capability ID.

Figure 13:
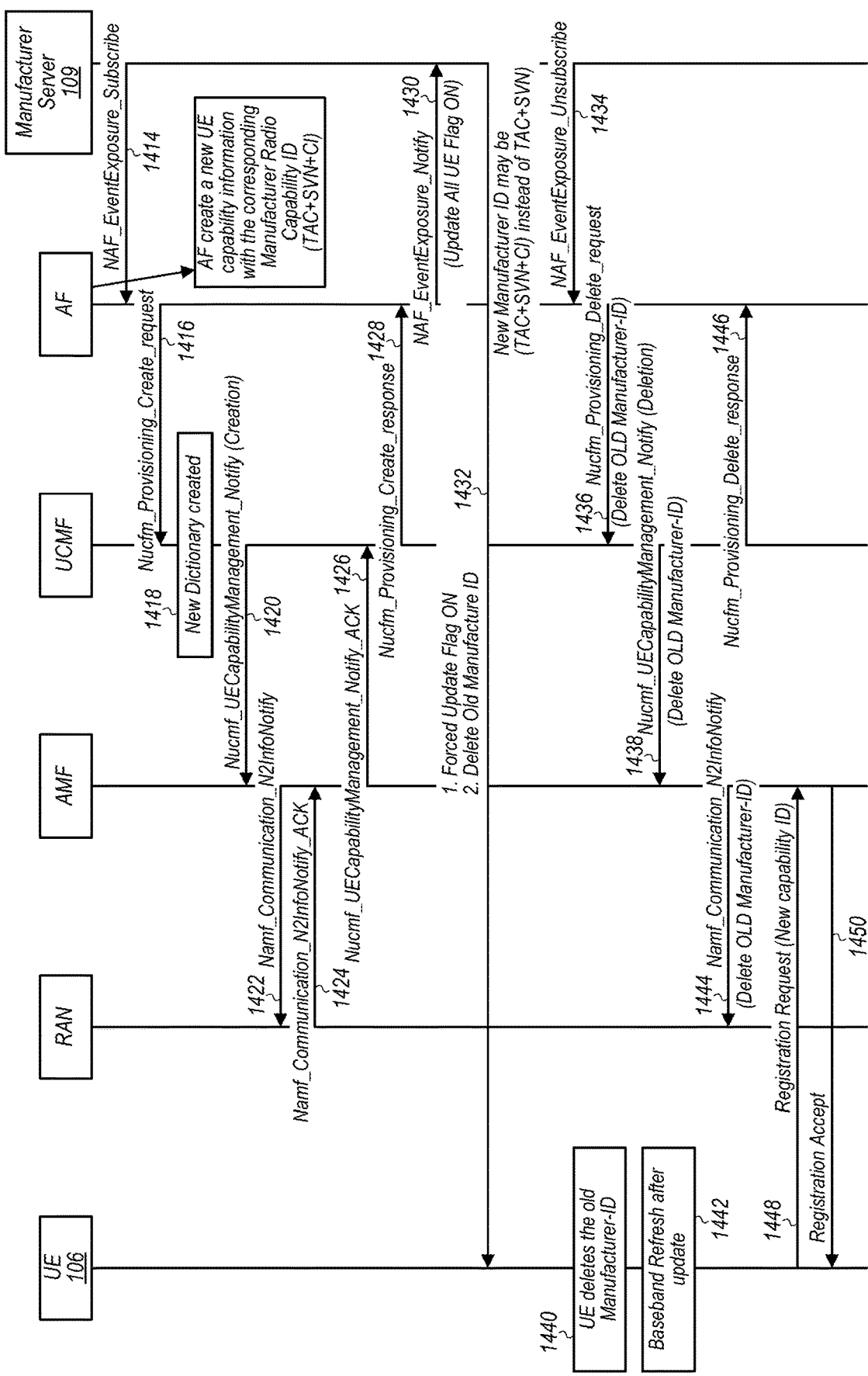
FIGS. 13-16 illustrate example call flows for forced capability updates, according to some embodiments.

FIG. 13 is a call flow diagram illustrating example aspects of the methods of FIG. 12, in the case of a manufacturer-assigned UE radio capability ID according to some embodiments.

Prior to the illustrated aspects, a new UE capability information with the corresponding UE radio capability ID may be created in AF by a manufacturer server 109. The AMF may be subscribed to UCMF, e.g., using Nucmf_UECapabilityManagement_Subscribe. Similarly, the RAN may be subscribed to AMF, e.g., using Namf_Communication_N2InfoSubscribe.

As shown, a manufacturer server 109 may send a Naf_EventExposure_Subscribe message to AF (1414). This step may serve to indicate to the AF to start a procedure to create a new UE radio capability ID in all NFs. The UE radio capability ID may be a manufacturer-created ID.

The AF may send the new UE capability information (e.g., potentially with a corresponding manufacturer-assigned UE radio capability ID to the UCMF via N57 interface using Nucmf_Provisioning_Create_request (1416). Note that the AF may use the new manufacturer-assigned UE radio capability ID as TAC+SVN+CI or model ID+SVN+CI.

The UCMF may create one or more new dictionary entries for the received UE capability information (1418). The dictionary entry may include the corresponding manufacturer-assigned UE radio capability ID (e.g., based on TAC+SVN+CI or model ID+SVN+CI, according to some embodiments). The UCMF may maintain a list of TACs for which the PLMN has obtained (e.g., manufacturer-assigned) UE radio capability IDs and may update the list as part of creating the new dictionary entry or entries.

The UCMF may provide the new UE radio capability ID to the AMF via N55 interface, e.g., using Nucmf_UECapabilityManagement_Notify (Creation) (1420).

The AMF may forward the new UE radio capability ID to the RAN using Namf_Communication_N2InfoNotify (1422).

The RAN may send an acknowledgement (ACK) to the AMF once the new UE radio capability ID is added to the RAN's local database, e.g., using Namf_Communication_N2InfoNotify_ACK (1424).

The AMF may send an ACK to UCMF once the new UE radio capability ID is added to its local database, e.g., using Nucmf_UECapabilityManagement_Notify_ACK (1426).

The UCMF may inform the AF that the new UE radio capability ID has been updated in all network entities (1428), e.g., using Nucmf_Provisioning_Create_response.

The AF may inform the manufacturer server that the network has received the information about the capability update (1430). This acknowledgement (e.g., flag) of the update may be an indication for the manufacturer server to push the forced capability update to all UEs with the new UE radio capability ID (e.g., TAC+SVN+CI or model ID+SVN+CI), e.g., using Naf_EventExposure_Notify. The acknowledgment may confirm that multiple (e.g., all) relevant network entities have received the information about the capability update.

The manufacturer server may transmit the forced update (1432), e.g., with 2 flags to UE(s). The flags may inform the UE to implement the forced capability update with new UE radio capability ID and to delete the old UE radio capability ID.

The manufacturer server may send Naf_EventExposure_Unsubscribe to AF (1434). This step may serve to indicate to the AF to start a procedure to delete the old UE radio capability ID in all NFs. Accordingly, the UCMF, AMF, and RAN may transmit respective messages to trigger the deletion of the old UE radio capability ID (1436, 1438, 1444). The UCMF may send a delete response (1446).

Each UE 106 may delete the old ID (1440) and initiate a baseband refresh (1442) and perform registration with new UE radio capability ID (1448). The AMF may accept the registration (1450).

Figure 14:
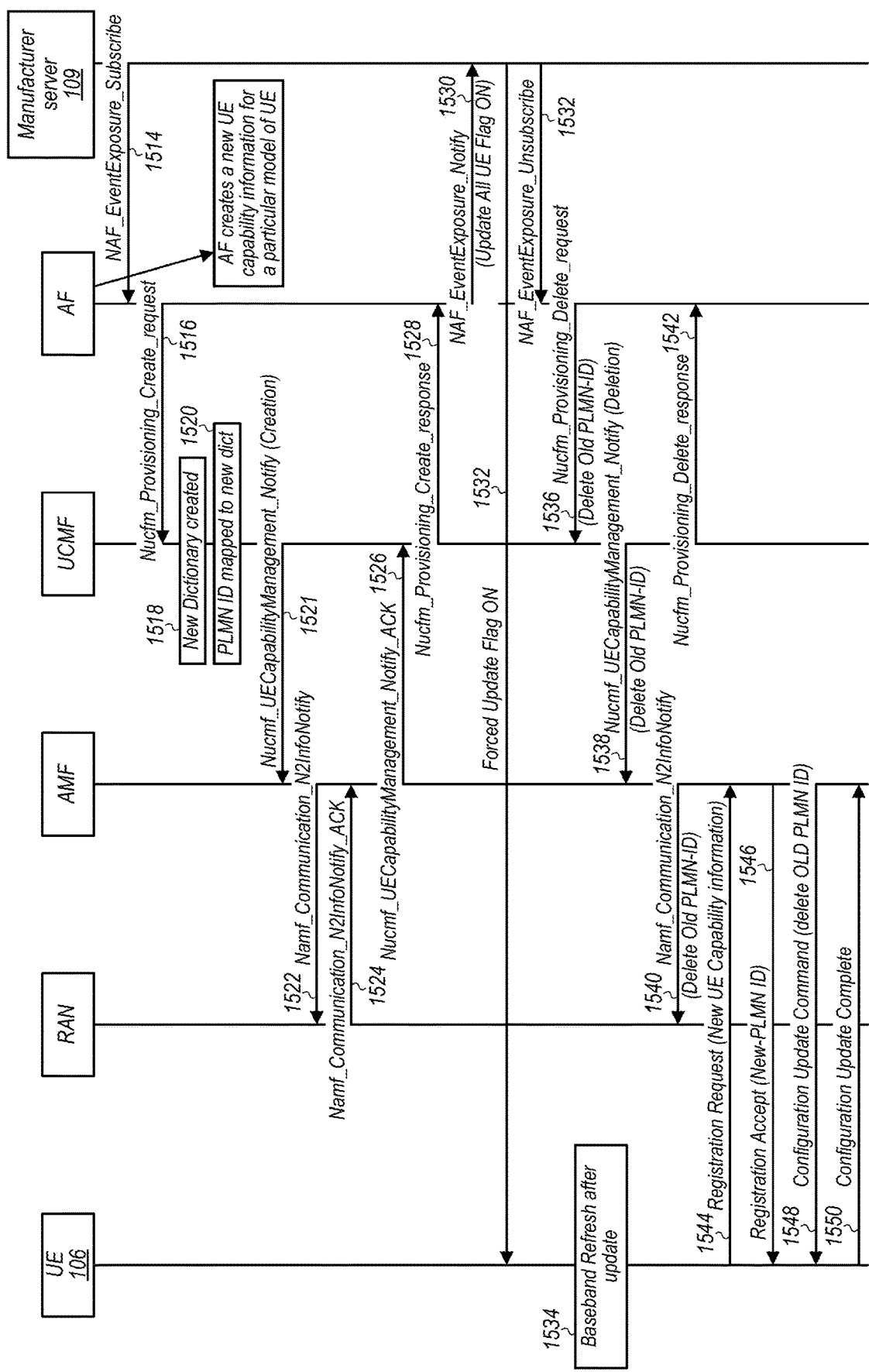

FIG. 14 is a call flow diagram illustrating exemplary aspects of the methods of FIG. 12, e.g., in the case of a PLMN-assigned UE radio capability ID, according to some embodiments.

Prior to the illustrated aspects, a new UE capability information (e.g., capability update) may be created in AF by manufacturer server 109, the AMF may subscribed to UCMF, e.g., using Nucmf_UECapabilityManagement_Subscribe, and the RAN may be subscribed to AMF, e.g., using Namf_Communication_N2InfoSubscribe.

The manufacturer server may send Naf_EventExposure_Subscribe to AF (1514). This step may indicate to the AF to start procedure to create new UE radio capability ID in all NFs.

The AF may send the new UE capability information to the UCMF (1516) via N57 interface, e.g., using Nucmf_Provisioning_Create_request.

The UCMF may create new dictionary entries for the received UE capability information along with a corresponding manufacturer-assigned UE radio capability ID (e.g., if a manufacturer-assigned ID is provided) (1518).

The UCMF may assign a PLMN-assigned UE radio capability ID mapped to the new dictionary entry (1520). The PLMN-assigned UE radio capability ID may correspond to (e.g., be mapped to, but different from) the manufacturer-assigned UE radio capability ID.

The UCMF may forward the new PLMN assigned UE radio capability ID to the AMF (1521) via N55 interface, e.g., using Nucmf_UECapabilityManagement_Notify (Creation).

The AMF may forward the new PLMN-assigned UE radio capability ID to the RAN using Namf_Communication_N2InfoNotify (1522).

The RAN may send an ACK to AMF (1524), e.g., once new PLMN-assigned UE radio capability ID is updated, e.g., using Namf_Communication_N2InfoNotify_ACK.

The AMF may send an ACK to UCMF (1526), e.g., once new PLMN-assigned UE radio capability ID is updated, e.g., using Nucmf_UECapabilityManagement_Notify_ACK.

The UCMF may inform the AF that the new PLMN-assigned UE radio capability ID has been updated in network entities (1528), e.g., using Nucmf_Provisioning_Create_response.

The AF may inform the manufacturer server that the new PLMN-assigned UE radio capability ID has been updated in network entities (1530), e.g., using Naf_EventExposure_Notify.

Accordingly, the manufacturer server may proceed to push the forced capability update to relevant UEs (1532). For example, the manufacturer server may raise a flag to UE indicating "Forced CB Update".

The manufacturer server may send Naf_EventExposure_Unsubscribe to AF (1532). This unsubscribe message may indicate to the AF to start procedure to delete old UE radio capability ID in all NFs. The NFs may transmit messages accordingly (1536, 1538, 1540, 1542).

Each UE 106 may perform the update, initiate a baseband refresh (1534) and perform registration with new UE radio capability ID (1544).

The AMF may assign the new (e.g., PLMN-assigned) UE radio capability ID to each UE, e.g., in a registration accept message in response to the registration of each UE (1546). Further, the AMF may send a "Configuration Update Command" message to UE to delete the old UE radio capability ID (1548), e.g., in response to the registration. The UE may respond with a configuration update complete (1550).

Exemplary additions and/or modifications to standards documents that may be made in association with implementation of the methods of FIG. 12 are described below.

A first addition may be made to clause 5.2.18.3.5 of 3GPP technical specification 23.502 to add that the Nucmf_UECapabilityManagement_Notify message sent from UCMF to AMF, should contain an information element (IE) (e.g., optional or required) mentioning an ACK may be sent in response. This ACK may be listed as an optional or required output.

A second addition may be made to clause 5.2.2.2.10 of 3GPP technical specification 23.502 to add that the Namf_Communication_N2InfoNotify message may contain "UE radio capability ID" in N2 Information. This may be listed as a required input. Further, the corresponding Namf_Communication_N2InfoNotify message sent from AMF to RAN may contain an IE (e.g., optional or required) mentioning an ACK may be sent in response to this Notify message. This ACK may be listed as an optional or required output.

Table 5.2.2.1-1 of 3GPPP TS 23.502 v.16.1.0, reproduced below, highlights the N2InfoNotify in a list of AMF services, according to some embodiments.

| Service Name | Service Operations | Operation Semantic | Known Consumer(s) |
| --- | --- | --- | --- |
| Namf_Communication | UEContextTransfer | Request/Response | Peer AMF |
| | CreateUEContext | Request/Response | Peer AMF |
| | ReleaseUEContext | Request/Response | Peer AMF |
| | RegistrationCompleteNotify | Subscribe/Notify | Peer AMF |
| | N1MessageNotify | Subscribe/Notify | SMF, SMSF, PCF, LMF, Peer AMF |
| | N1MessageSubscribe | | SMF, SMSF, PCF |
| | N1MessageUnSubscribe | | SMF, SMSF, PCF |
| | N1N2MessageTransfer | Request/Response | SMF, SMSF, PCF, LMF |
| | N1N2TransferFailureNotification | Subscribe/Notify | SMF, SMSF, PCF, LMF |
| | N2InfoSubscribe | Subscribe/Notify | NOTE 1 |
| | N2InfoUnSubscribe | | NOTE 1 |

-continued

| Service Name | Service Operations | Operation Semantic | Known Consumer(s) |
|---|---|---|---|
| | N2InfoNotify | | AMF, LMF |
| | EBIAssignment | Request/Response | SMF |
| | AMFStatusChangeSubscribe | Subscribe/Notify | SMF, PCF, NEF, SMSF, UDM |
| | AMFStatusChangeUnSubscribe | Subscribe/Notify | SMF, PCF, NEF, SMSF, UDM |
| | AMFStatusChangeNotify | Subscribe/Notify | SMF, PCF, NEF, SMSF, UDM |
| Namf_EventExposure | Subscribe | Subscribe/Notify | NEF, SMF, UDM |
| | Unsubscribe | Subscribe/Notify | NEF, SMF, UDM |
| | Notify | Subscribe/Notify | NEF, SMF, UDM |
| Namf_MT | EnableUEReachability | Request/Response | SMSF |
| | ProvideDomainSelectionInfo | Request/Response | UDM |
| Namf_Location | ProvidePositioningInfo | Request/Response | GMLC |
| | EventNotify | Subscribe/Notify | GMLC |
| | ProvideLocationInfo | Request/Response | UDM |
| | CancelLocation | Request/Response | GMLC |

NOTE 1:
In this Release of the specification no known consumer is identified to use this service operation.

A third addition may be made to clause 5.2.19.2.4 of 3GPP TS 23.502 to add that a Naf_EventExposure_Notify message sent from AF to a manufacturer server 109, may contain an optional IE indication "Flag to update all UEs" or add an additional "entry" to "Event Specific Parameter List". Thus, a flag to update all UEs (e.g., to provide the capability update to UEs as the network has been updated with new ID information and dictionary entry corresponding to the capability update) may be listed as an optional (e.g., or required) input.

Figure 15:
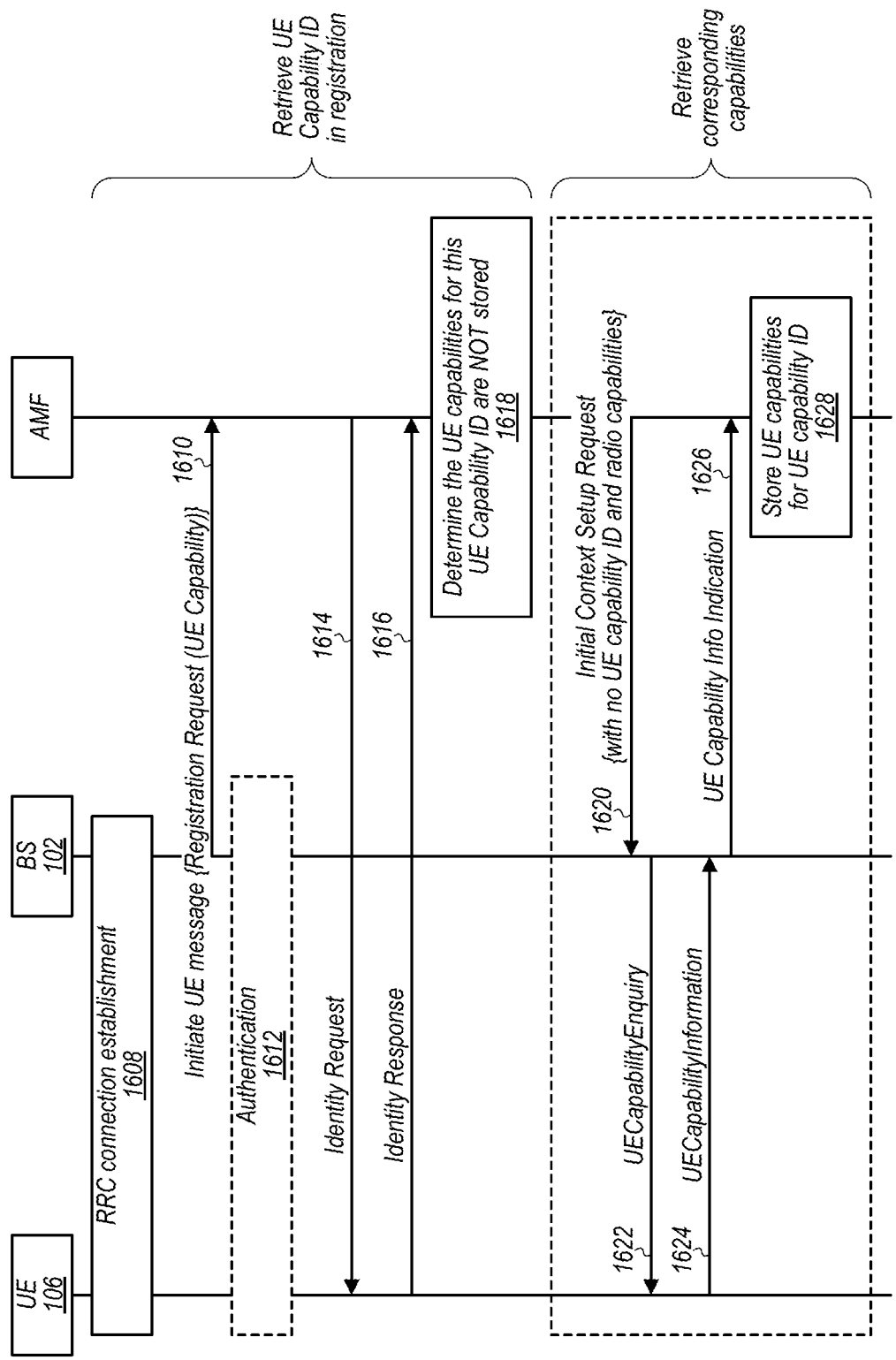
Figure 16:
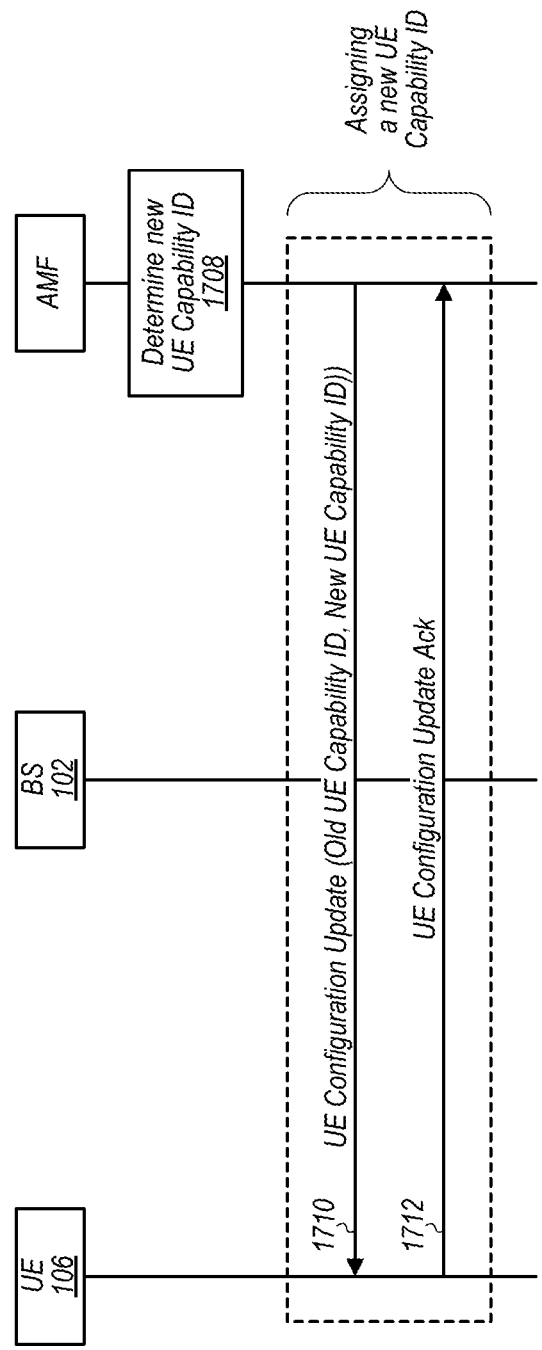

A fourth addition may be made to clause 6.5.3 of 3GPP TS 23.743 to add that a configuration update command (e.g., from AMF to UE) should include an IE to delete any old PLMN ID. FIG. 15 illustrates UE registration followed by a retrieval of UE capabilities, according to some embodiments. FIG. 16 illustrates assignment of a new UE radio capability ID, according to some embodiments. As noted above, the configuration update command may be modified (e.g., relative to existing specifications) to include an IE to cause the UE to delete a previous PLMN ID (e.g., or multiple previous PLMN IDs).

Figure 17:
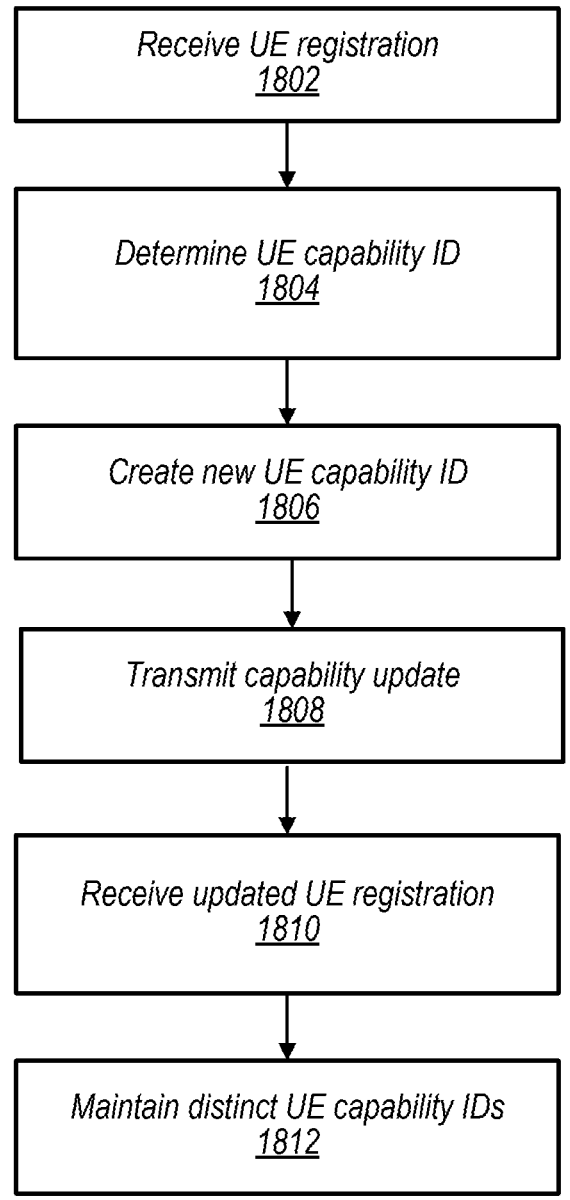
FIG. 17 is flow chart diagram illustrating an example method for unforced capability update, according to some embodiments.
Figure 18:
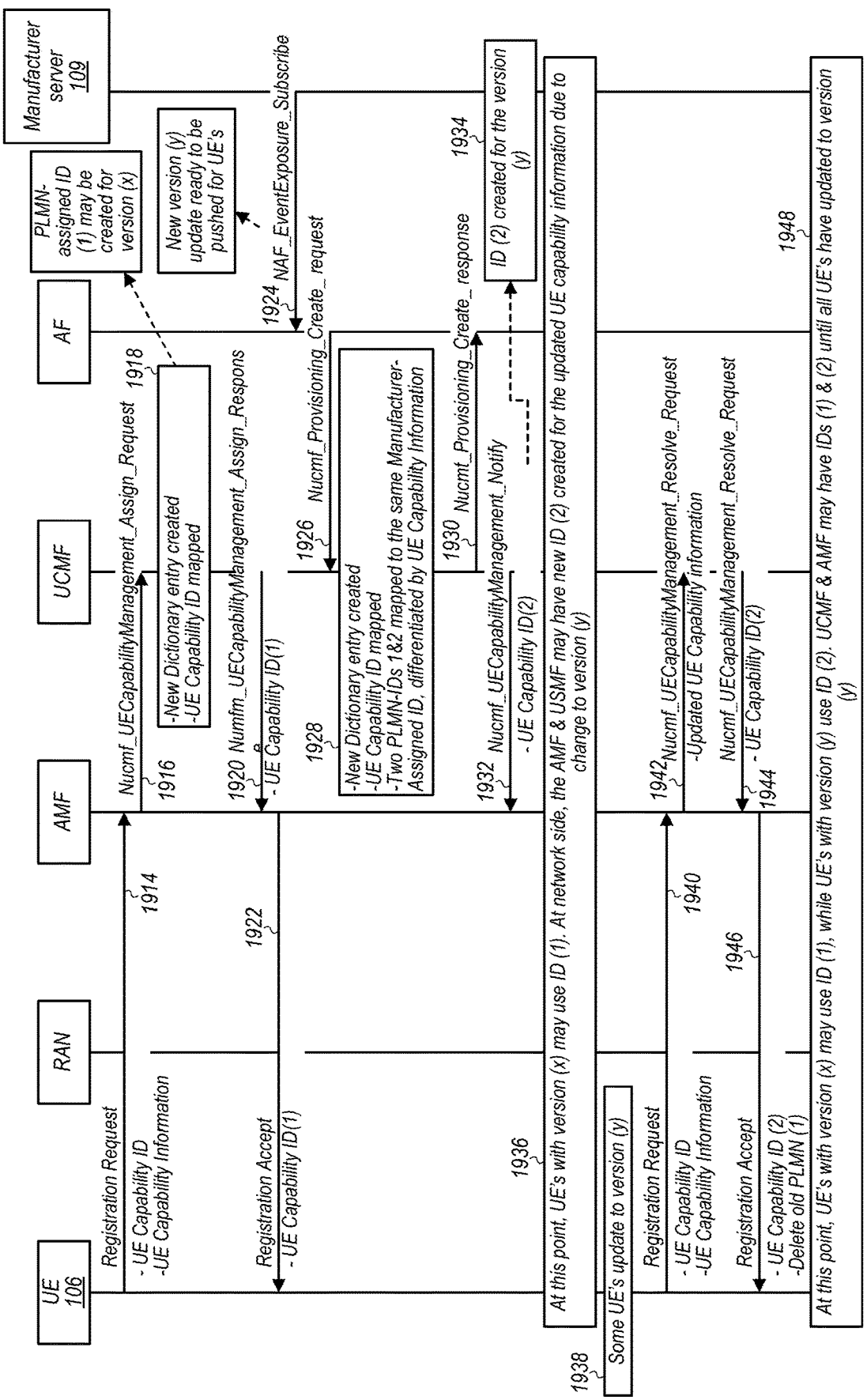
FIG. 18 illustrates an example call flow for an unforced capability update, according to some embodiments.

FIGS. 17-18—Updating UE Radio Capability Via an Unforced Update

As noted above, UE radio capabilities may be updated using an unforced update (e.g., which may be performed at the discretion of the individual UE and/or user). For example, these unforced capability updates may be stored in the UE implemented only when the user initiates the update (e.g., by going to General→Settings→About, according to some embodiments).

For a same manufacturer-assigned UE radio capability ID (e.g., TAC+SVN or model ID+SVN), a network may maintain two different PLMN IDs based on the UE capability information, according to some embodiments. The difference in UE capability information may be due to different versions of capability updates on different UEs (e.g., a first UE may have implemented a recent capability update while a second UE has not, accordingly the two UEs may have different capabilities, but a same UE radio capability ID based on TAC and SVN or model ID and SVN). In other words, there could be a scenario where UE capability between the same hardware and same location (e.g., and same PLMN) could differ due to different capability update versions. Thus, the PLMN may maintain two different PLMN-assigned IDs for the same manufacturer-assigned ID FIG. 17 is a flow diagram which illustrates exemplary aspects of an unforced capability update, according to some embodiments. Aspects of the method of FIG. 17 may be implemented by a cellular network (e.g., including CN elements such as an AMF, UCMF, etc. and a RAN including a BS 102) in communication with a UE 106 and in further communication with a manufacturer server 109, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.), or manufacturer server 109 may cause the UE, base station, network element(s), and/or manufacturer server to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

The network 100 may receive a registration request from a UE 106 (e.g., or multiple requests from multiple UEs) (1802), according to some embodiments. The registration request may include a UE radio capability ID or may include information about the UE's radio capabilities. For example, a first plurality of UEs (e.g., of a particular model) may register with the network.

The network 100 may determine an initial UE radio capability ID for the UE(s) 106 (1804), according to some embodiments. The initial UE radio capability ID may be PLMN-assigned or may be manufacturer-assigned. The initial UE radio capability ID may include information about a capability update (e.g., the ID may enable the network to distinguish between similar UEs which have and have not implemented a particular capability update) or the UE radio capability ID may not include such information.

The network 100 may create a new UE radio capability ID (1806), according to some embodiments. The new UE radio capability ID may be created in response to a request for a new UE radio capability ID received from a manufacturer server 109. For example, the request may be associated with an unforced capability update that the manufacturer server 109 will soon release for (e.g., push out to) UE(s) 106, e.g., of the particular model. Such a request may provide information about the capabilities of UEs that implement the capability update.

The network 100 may transmit a capability update (e.g., associated with the new UE radio capability ID) to the UE(s) 106 (1808), according to some embodiments. For example, the manufacturer server 109 may provide the capability update to the UEs via the CN and RAN of the network 100. For example, the network may send the capability update to all UEs of the particular model registered with the network.

The network 100 may receive an updated registration request from a UE 106 (e.g., or multiple requests from multiple UEs) (1810), according to some embodiments. The registration request may include the new UE radio capability ID. Accordingly, the network may recognize that a re-registering UE has implemented the capability update and may update the registration of the UE (e.g., including the stored UE radio capability ID for the UE(s)) accordingly. For example, a subset of the first plurality of UEs may re-register with the new UE radio capability ID.

The network 100 may maintain distinct UE radio capability IDs for the UEs which have and have not implemented the update (1812), according to some embodiments. For example, the network may associate the new UE radio capability ID with the subset of the first plurality of UEs that have implemented the capability update and may associate the initial UE radio capability ID with UEs which have not implemented the capability update. Thus, the network may communicate with UEs of the same model using different capabilities according to the different UE radio capability IDs. It will be appreciated that over time additional UEs may implement the update and accordingly may re-register with the new UE radio capability ID.

FIG. 18 illustrates an example message flow according to some embodiments of the method of FIG. 17. For example, a new UE model (e.g., iPhone XS) may be launched in a market (e.g., region). An AF may request the UCMF to create a new dictionary entry for this model (e.g., a first manufacturer-assigned UE radio capability ID and UE capability information may be shared). Accordingly, the UCMF may create a first dictionary entry for this UE model. Alternatively, the AF may only share the UE capability information to the UCMF. Accordingly, the UCMF may create a new dictionary entry and assign a first PLMN-assigned UE radio capability ID.

As illustrated in FIG. 18, UEs (e.g., of the new model, e.g., with an initial bundle/capability version 'x') may be powered up and may send registration request to AMF. The registration request may include a UE radio capability ID, e.g., manufacturer-assigned. The AMF may request the UCMF to create a dictionary entry and assign the first PLMN-assigned UE radio capability ID to all the registering UEs. The AMF may accept the registration of the UEs. In some networks where PLMN-assigned UE radio capability ID is not supported, AMF and UCMF may continue to use manufacturer-assigned UE radio capability ID.

In response to a request from the manufacturer server 109, the AF may signal the UCMF to create a second new dictionary entry for same UE model but with updated "UE capability information", e.g., in preparation for an unforced capability update. In response, the UCMF may create a second new dictionary entry and notify the AMF. Thus, two UE radio capability IDs may be maintained by the UCMF for the new UE model, e.g., a first UE radio capability ID for UEs that have not implemented the update and a second UE radio capability ID for the UEs that have implemented the update. In some embodiments, the two UE radio capability IDs may be PLMN-assigned IDs that correspond to a same manufacturer-assigned ID. In some embodiments, both UE radio capability IDs may be manufacturer-assigned. In some embodiments, the UCMF may provide a new PLMN-assigned UE radio capability ID to the manufacturer server, e.g., for the manufacturer server to provide to UEs along with the capability update.

The manufacturer server may push the capability update to all UEs of the new model. In some embodiments, the manufacturer server may indicate a UE radio capability ID (e.g., manufacturer-assigned or PLMN-assigned) associated with the capability update version "y".

A subset of the UEs may update to the new bundle/capability version "y". The UEs which have updated to bundle/capability version 'y' may perform a baseband reset and may transmit a new registration request to AMF.

In some embodiments, the new registration request may be sent with same (e.g., first) manufacturer-assigned UE radio capability ID, but with new UE capability information. Accordingly, the AMF may retrieve the corresponding (e.g., second) PLMN-assigned UE radio capability ID (e.g., which may correspond to bundle/capability version "y") from the UCMF and may provide the second PLMN-assigned UE radio capability ID to the UE in a registration accept message.

In some embodiments, the new registration request may be sent with a second UE radio capability ID (e.g., which may correspond to bundle/capability version "y"). The second UE radio capability ID may be manufacturer-assigned or PLMN-assigned.

The network may maintain two UE radio capability IDs for same UE model at the same location, only to be differentiated by UE capability information. For example, the network may maintain both the first and second UE radio capability IDs and use them for UEs which, respectively, have not and have implemented the update.

FIGS. 19-23—Dynamic UE Radio Capability ID Switch

From time to time, a UE may need to change (e.g., reduce or expand) its capabilities. For example, in response to various thermal and/or battery conditions (e.g., temperature of one or more components of the UE above a relevant thermal threshold or thresholds, battery level below a battery threshold, etc.), a UE may operate using a reduced set of capabilities for a period of time (e.g., until the condition(s) that led to the reduced capability change(s), until a timer expires, etc.). Accordingly, a UE may have multiple possible sets of capabilities. These sets of capabilities may be associated with different UE radio capability IDs. For example, a UE would may maintain a set of UE radio capability IDs for various capabilities including: one ID each for different services like broadband, reduced version of broadband in case of thermal or low power scenarios, internet of things (IoT), machine type communication (MTC), ultra-reliable low latency communication (uRLLC), etc.

For example, a PLMN may decide to operate based on manufacturer-assigned UE radio capability ID for a particular type of UE (e.g. based on TAC and/or SV). For a particular set of UE radio capability IDs that may be assumed to operate based on UE manufacturer-assigned UE radio capability ID, the AMF may indicate to UEs to delete the PLMN-assigned UE radio capability ID. A UE that receives an indication to delete the PLMN-assigned UE radio capability ID in the Registration Accept message or UE configuration update command message may delete any PLMN-assigned UE radio capability IDs for this PLMN. The UE may then proceed to register with the manufacturer assigned UE radio capability ID that is applicable to the current UE radio configuration (e.g., current capability). The interaction between UCMF and AMF in order to switch to operate based on manufacturer-assigned UE radio capability ID for a particular type of UE is considered for future study in TS 23.501 v. 16.2.0. In some embodiments, at any given time at most one UE radio capability ID is stored in the UE context in CN and RAN.

In some embodiments, during the initial registration procedure the UE may send a plurality of UE radio capability IDs to the network, e.g., in order to inform the network of various IDs that the UE may use under various conditions. Such IDs may be used on a temporary basis (e.g., based on conditions), and may be described as temporary IDs. The UE may also provide information about the meaning of each ID, e.g., describe the capabilities associated with each ID. For example, the UE may provide one or more UE radio capability IDs similar to the following, among various possibilities:

ID 1: Full configuration with all features enabled;
ID 2: Reduce data throughput capabilities considering battery/power levels;
ID 3: Restricted set of UE capability (e.g., lower maximum bandwidth, lower/fewer CA combinations, restricted MIMO options (e.g., no 4×4 MIMO), etc.) for thermal or low power conditions;
ID 4: Low latency mode of operation (uRLLC, V2X, etc.);
ID 6: IoT mode of operation; and/or
ID 7: Any other capabilities addition/restriction.

In some embodiments, using such a list of UE radio capability IDs may result in a computational challenge for the network. For example, every time AMF initiates the "Assign" or "Resolve" procedure, the UCMF may stream through its (e.g., potentially huge) dictionary/database and find the exact matching UE radio capability ID or UE capability information respectively. Assuming each UE model maintains 7 different UE capability information in the UCMF, and considering the amount of UE models released in the market (e.g., 1000 per year), a large number (e.g., 7000) dictionary entries may be added to the dictionary/database each year. Accordingly, for temporary situations, it may be inefficient to use UCMF resources (e.g., dictionary entry and/or PLMN-ID) and the AMF↔UCMF interface for storing and signaling use of such IDs.

Figure 19:
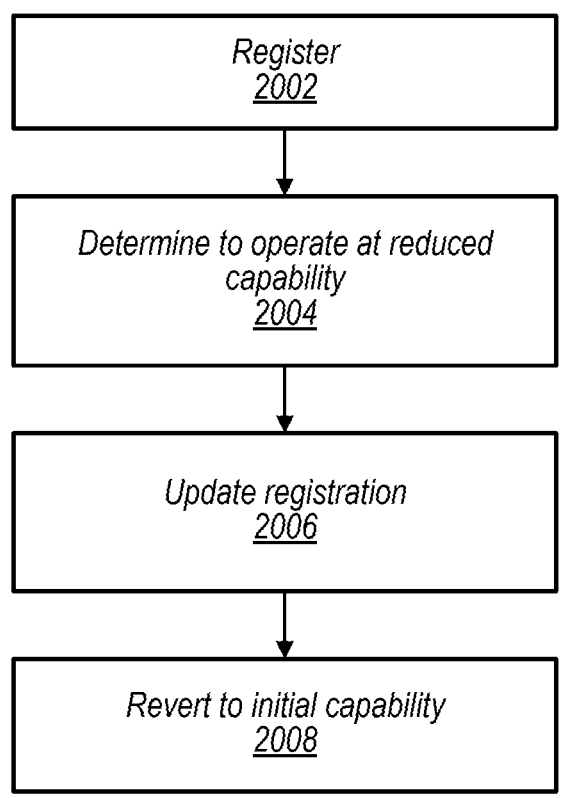
FIG. 19 is flow chart diagram illustrating an example method for dynamically changing UE radio capability ID, according to some embodiments.

FIG. 19 is a flow diagram which illustrates exemplary aspects of dynamic switching of UE radio capability IDs, according to some embodiments. Aspects of the method of FIG. 19 may be implemented by a cellular network (e.g., including CN elements such as an AMF, UCMF, etc. and a RAN including a BS 102) in communication with a UE 106 and in further communication with a manufacturer server 109, as illustrated in and described with respect to the Figures, or more generally in conjunction with any of the computer circuitry, systems, devices, elements, or components shown in the Figures, among other devices, as desired. For example, a processor (or processors) of the UE (e.g., processor(s) 302, processor(s) associated with communication circuitry 329 or 330 such as processor(s) 512 and/or 522, etc.), base station (e.g., processor(s) 404, or a processor associated with radio 430 and/or communication chain 432, among various possibilities), or network element (e.g., any component of NGC 606, EPC 600, etc.), or manufacturer server 109 may cause the UE, base station, network element (s), and/or manufacturer server to perform some or all of the illustrated method elements. For example, a baseband processor or application processor of the UE may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

A UE 106 may register with a network 100 (2002), according to some embodiments. The registration may be an initial registration. The UE may provide full UE capability information or a manufacturer-assigned UE radio capability ID. The network may assign a PLMN-assigned UE radio capability ID. The UE may initially operate using its full capability, e.g., according to the initial UE radio capability ID.

The UE 106 may determine to operate at a reduced capability on a temporary basis (2004), according to some embodiments. This determination may be based on one or more conditions present at the device such as temperature, battery level, etc. For example, in response to detecting a changed condition, the UE may determine to reduce its capability for a period of time (e.g., 10 minutes, among various possibilities). For example, in response to a temperature of one or more components of the UE reaching a thermal threshold (or thresholds) the UE may determine to reduce its transmit power for a period of time to allow the component to cool down. For example, when a UE hits a thermal condition (e.g., a temporary situation, e.g., 10 mins), the UE may decide to restrict its UE capability information to save power (e.g., restrict number of DL/UL component carriers (CC), disable 4×4 MIMO, etc.) for a period of time. The duration of the period of time may be pre-defined (e.g., using a timer, e.g., 10 minutes) and/or may be determined dynamically (e.g., based on improvement in measurements of the temperature, battery level, or other condition(s) that led to the reduction in capability).

The UE 106 may re-register or otherwise update its registration with the network 100 (2006), according to some embodiments. For example, the UE may re-register in response to the determination to operate at the reduced capability. The re-registration may allow the UE to inform the network of the reduced capability.

For example, the UE may send an updated registration request to AMF with the following IEs: temporary UE radio capability ID and restricted UE radio capability information (e.g., a description of the temporarily restricted capability). The temporary UE radio capability ID may thus be associated with the temporarily restricted capability in the network.

In some embodiments, the registration request may further include an IE describing a validity period (e.g., a timer for the length of the capability restriction).

The network (e.g., AMF) may receive the updated registration request.

In some embodiments, the AMF may inform the UCMF to create a dictionary entry in its dictionary, but not to assign a PLMN-assigned UE radio capability ID. This may avoid/reduce excessive use of PLMN-assigned UE radio capability IDs.

In some embodiments, the AMF may create a local cache and maintains this session with the UE without informing the UCMF to create a dictionary entry. This may avoid/reduce the use of dictionary entries and PLMN-assigned UE radio capability IDs.

The AMF may send, and the UE may receive a registration accept. Thus, the UE may continue the session with the temporary UE radio capability ID and operating with the temporarily reduced capability.

The UE 106 may revert to the initial UE radio capability ID (2008), according to some embodiments. For example, in response to a determination that conditions (e.g., thermal conditions, battery level, etc.) have improved or in response to determination that the validity period timer expires, the UE revert back to the initial UE radio capability ID.

In some embodiments, this reversion may be accomplished by a further registration procedure (e.g., re-registration). For example, the UE may re-register using the initial UE radio capability ID. Such a re-registration may signal to the network that the UE may now operate at full capability, e.g., as described by the initial UE radio capability ID.

In some embodiments, this reversion may occur automatically, e.g., at the expiration of a validity timer associated with the temporary capability reduction. For example, if such a timer is initiated when the temporary capability reduction begins, then no further signaling may be required to revert to full capability and the initial UE radio capability ID. However, it should be noted that if the validity period timer expires and the (e.g., thermal) conditions do not improve, the UE may extend the validity timer. For example, a new IE may be defined for any message from UE to AMF, e.g., to extend the duration of the validity timer. Further, the UE may initiate a re-registration (e.g., at or prior to expiration of the timer) in order to re-start the validity (e.g., with the same duration or a different duration) in order to allow more time for conditions to improve prior to reverting to full capability. Still further, the UE may initiate reversion prior to expiration of the timer in response to a determination that conditions at the UE have improved, e.g., the reversion may not be based on expiration of the timer.

Figure 20:
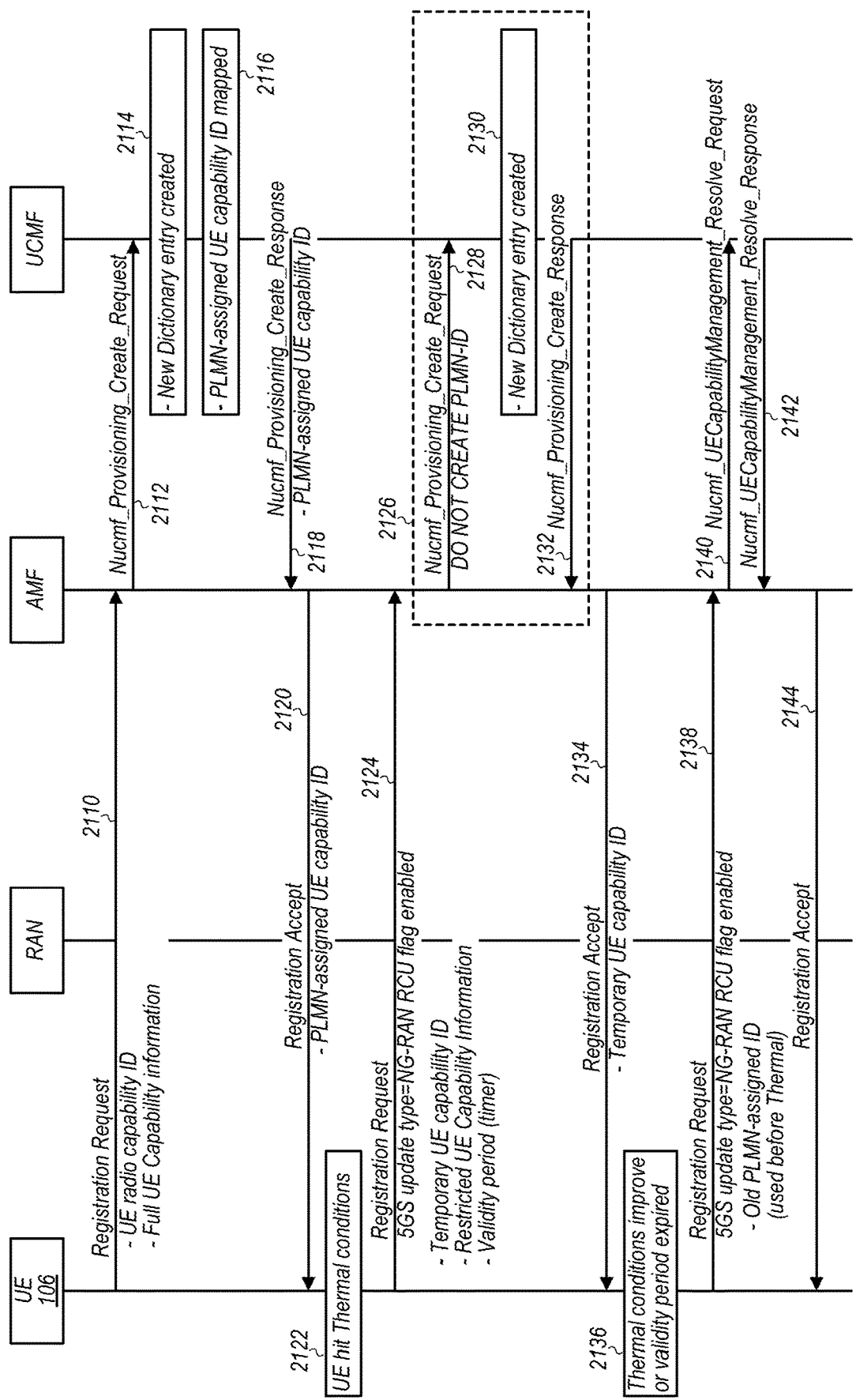
FIGS. 20-23 illustrate aspects of dynamically changing UE radio capability ID, according to some embodiments.
Figure 21:
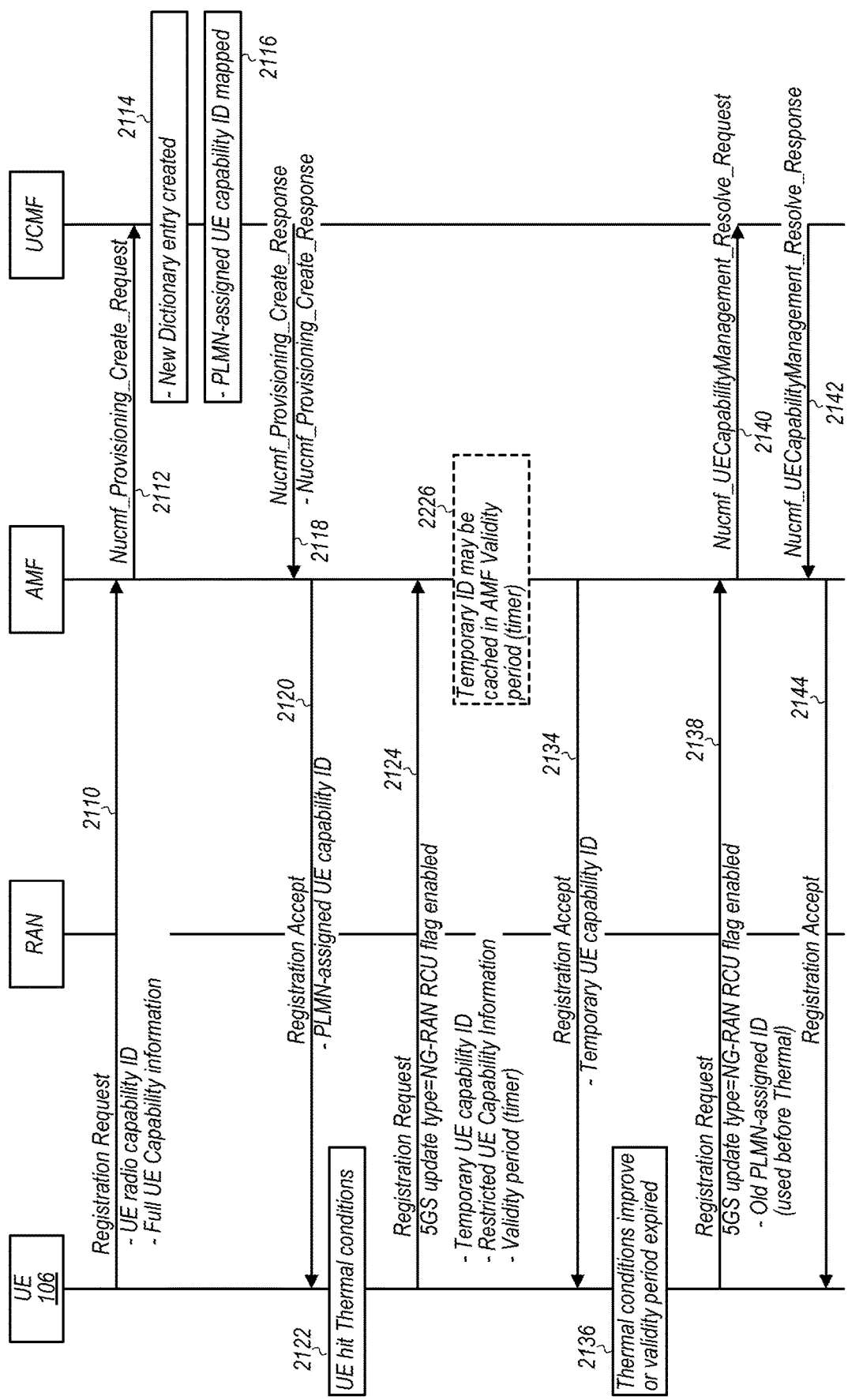

FIGS. 20 and 21 are call flow diagrams illustrating example aspects of the method of FIG. 19, according to some embodiments. FIG. 20 illustrates embodiments in which the AMF informs the UCMF of a UE's reduced capability and FIG. 21 illustrates embodiments in which the AMF caches a temporary ID for the UE locally.

As shown in FIG. 20, a UE 106 (e.g., which supports RACS) may send the full UE capability information to the AMF during an initial registration procedure (2110).

The AMF may signal the UCMF to create a new dictionary entry in its dictionary and store the UE capability information via the Nucmf_Provisioning (Create) service message (2112). In response, the UCMF may store the association in its dictionary (2114, 2116) and may send back a newly created PLMN-assigned UE radio capability ID (e.g., ID A) to AMF via the Nucmf_UECapabilityManagement (Assign) service (2118).

The AMF may send a registration accept message to the UE, e.g., including the PLMN-assigned ID "A" (2120).

The UE may determine to operate at a reduced capability, e.g., in response to reaching a thermal condition (e.g., temperature reaching a threshold) (2122). In response, the UE may send a registration request to AMF, e.g., with an NG-RAN radio capability update (RCU) flag enabled, e.g., in a "5GS update type" IE (2124). Note that 5GS Update Type may be the IE specified in 3GPP 24.501 and that 5GS may refer to 5G System (e.g., similar to EPS for LTE). This registration message may inform the network that UE wants to change its UE radio capability ID and/or capability.

In response to the updated registration request, the AMF may signal the RAN (e.g., BS 102) to enquire for the new UE capability information. Accordingly, the RAN may send a UE capability enquiry message to UE. In response the UE may send a UE capability information message, including a temporary UE radio capability ID, e.g., a new manufacturer-assigned UE radio capability ID, e.g., ID "b". The temporary ID may be sent with and associated with the reduced set of UE capability information. The UE may also request the AMF (e.g., via RAN) to change from PLMN-assigned ID to this new manufacturer-assigned ID for a temporary duration (e.g., until the thermal and/or other conditions improve).

The AMF may forward the new, temporary manufacturer-assigned ID to the UCMF to create a new dictionary entry in its dictionary via the Nucmf_Provisioning_Create_Request service (2128). The AMF may also inform the UCMF that from this moment, manufacturer-assigned ID may be used, e.g., until further notice. In some embodiments, the AMF may specify a start time for using the manufacturer-assigned ID and/or may specify an end time.

The UCMF may create the dictionary entry (2130) and acknowledge to AMF via Nucmf_Provisioning_Create_Response (2132). The AMF may send a registration accept including an acknowledgment to the UE of the successful change from PLMN-assigned ID to the temporary (e.g., manufacturer-assigned) ID ("b") (2134).

The UE may determine to operate at full capability, e.g., in response to overcoming the thermal condition (e.g., temperature reaching a second threshold) or a validity period expiring (2136). In response, the UE may send a registration request to AMF, e.g., with an NG-RAN RCU flag enabled, e.g., in a "5GS update type" IE (2138). This registration message may inform the network that UE wants to change its UE radio capability ID and/or capability, e.g., to full capability. For example, the registration message may include the PLMN-assigned UE radio capability ID (e.g., ID A), e.g., as used prior to the thermal condition.

In response to the registration request including the PLMN-assigned UE radio capability ID (e.g., ID A), the AMF may transmit a message (e.g., a Nucmf_UECapabilityManagement_Resolve_Request) to the UCMF including the PLMN-assigned UE radio capability ID (e.g., IDA) (2140). In response to the message, the UCMF may transmit a response (e.g., a Nucmf_UECapabilityManagement_Resolve_Respone) to the AMF, e.g., acknowledging the registration with the PLMN-assigned UE radio capability ID (e.g., ID A) (2142). In some embodiments, the response may include a description of the capabilities associated with the PLMN-assigned UE radio capability ID (e.g., ID A), e.g., based on the dictionary entry. The AMF may accept the registration (2144) and the UE and RAN may operate according the full capability.

As shown in FIG. 21, and as described above with respect to FIG. 20, a UE 106 may register (2110), the network may create a new dictionary entry in its dictionary (2112, 2114, 2116), and may send back a newly created PLMN-assigned UE radio capability ID (e.g., ID A) (2118, 2120). Later, the UE may determine to operate at a reduced capability (2122) and re-register with a temporary UE radio capability ID (2124). Further, the network may enquire about, and the UE may provide information about the UE's temporary capabilities, as described with respect to FIG. 20.

In response to the updated registration request, the AMF may store the temporary UE radio capability ID (2226). The AMF may cache the temporary ID locally (e.g., at the AMF) and may not transmit a notification to the UCMF. For example, the AMF may not request that the UCMF create a dictionary entry associated with the temporary UE radio capability ID. In some embodiments, the AMF and UE may initiate a validity timer associated with the temporary UE radio capability ID.

The remainder of FIG. 21 may proceed as described above with respect to FIG. 20. The AMF may send an acknowledgment to the UE of the successful change from PLMN-assigned ID to the temporary ID ("b") (2134). Further, the UE may determine to operate at full capability (2136) and re-register (2138). Further, the AMF may inform the UCMF and accept the registration (2140, 2142, 2144). The UE may communicate with the network according to full capability.

In some embodiments, various changes to technical specifications may be made, e.g., consistent with the techniques of FIGS. 19-21. For example, in a registration request, a UE may set the "IE Payload Container Type" to "UE Policy Container". The UE policy container may contain a list of UE policy section identifiers (UPSI). The UPSI may be made of two parts: PLMN-assigned UE radio capability ID and UE policy section code. In some embodiments, the specification may be changed to state that a manufacturer-assigned ID should also be included in this container. In some embodiments, the specification may be changed so that a validation timer should be associated with the temporary manufacturer-assigned UE radio capability ID.

In some embodiments, if the AMF receives a manufacturer-assigned UE radio capability ID with a validation timer assigned to it, the AMF may inform the UCMF to not create a PLMN-assigned UE radio capability ID. Accordingly, a specification change may include revising the message used to create new dictionary entry in UCMF (e.g., Nucmf_Provisioning_Create_Request) to include an IE "create PLMN-ID" which has a binary value indicating whether or not to create a new PLMN-assigned UE radio capability ID. For example, the IE may have value 0 or 1, where 0 indicates "do not create PLMN-ID" and 1 indicates "create a PLMN-ID".

Figure 22:
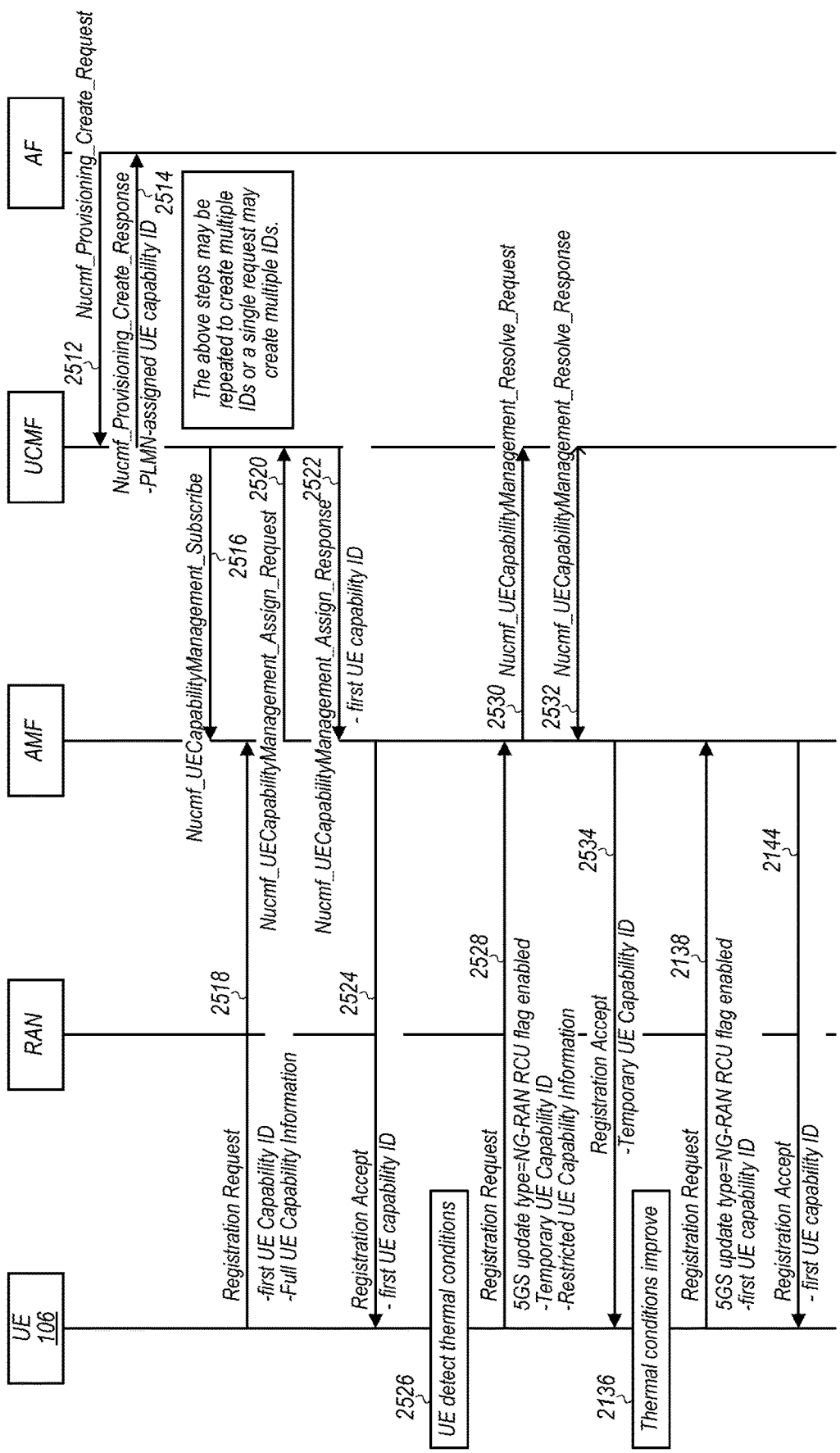

In some embodiments of the method of FIG. 19, the AF may provision the UCMF with a list of UE radio capability descriptions (e.g., similar to the descriptions of ID 1-ID 7 as described above, among various possibilities). Such a list may be provided prior to registration of any UE of a relevant model. The UCMF may assign PLMN-assigned UE capability IDs for each temporary UE radio capability provisioned by AF, which the UE(s) may use dynamically/temporarily, according to conditions. In some embodiments, instead of provisioning a list of UE radio capability descriptions, the AF may provision UCMF with a list of manufacturer-assigned UE radio capability IDs (e.g. similar to ID 1-ID 7 as described above, among various possibilities) prior to registration of any UE of a relevant model, which the UE(s) may use dynamically. In some embodiments, the UCMF may notify the AMF of the list. FIG. 22 is a call flow diagram illustrating example aspects of the method of FIG. 19 highlighting such UCMF and/or AF assignment and dynamic UE selection of IDs, according to some embodiments.

The AF may transmit one or more messages (e.g., Nucmf_Provisioning_Create_request) to the UCMF (e.g., using the N57 interface) to create or provision a set or list of UE radio capability IDs, each associated with its corresponding UE capability information (2512). The UCMF may acknowledge the request(s) (e.g., Nucmf_Provisioning_Create_Response) and create corresponding dictionary entry (entries) and UE radio capability IDs (2514). It will be appreciated that 2512 and 2514 can be performed once to create a plurality of UE radio capability IDs or 2512 and 2514 can be performed a plurality of times, e.g., for a single UE radio capability ID of the set or list of IDs each time. It will be appreciated that 2512 may be performed in response to input from a manufacturer server 109. Thus, the set or list of UE radio capability IDs may include manufacturer-assigned UE radio capability IDs and/or PLMN-assigned UE radio capability IDs. For example, the set or list of UE radio capability IDs may include the seven UE radio capability IDs described above, e.g., in the introduction of FIG. 19, among various possibilities. Note that other UE radio capability IDs may be used in addition to or instead of the provided examples.

The UCMF may transmit a message (e.g., Nucmf_UECapabilityManagement_Subscribe) informing the AMF of the created dictionary entries and UE radio capability IDs (2516). Note that a subscribe message may be used to inform or notify the AMF of creation or deletion of an entry in the UCMF. The AMF may maintain a list of the (e.g., PLMN-assigned) UE radio capability IDs and/or TAC values corresponding to the UE types for which the PLMN uses manufacturer-assigned UE radio capability IDs.

During an (e.g., initial) registration procedure, the UE may send a (e.g., manufacturer or PLMN-assigned) UE radio capability ID (e.g., ID a) which may contain the full UE capability information, to the AMF (2518).

In response to the registration, the AMF may enquire with the UCMF to check if the UE capability information is present in its dictionary (2520). In response to the enquiry, the UCMF may retrieve the (e.g., manufacturer or PLMN-assigned) UE radio capability ID and provide it to the AMF, e.g., via the Nucmf_UECapabilityManagement (Assign) service (2522). The AMF may transmit a registration accept message to the UE and may provide the UE radio capability ID (2524). In some embodiments, the AMF may also inform the UE of the set of UE radio capability IDs and the associated capabilities. In some embodiments, the AMF may use the registration accept message to request the UE to delete one or more (e.g., potentially all) PLMN-assigned UE radio capability IDs, e.g., if the UE registers with a PLMN-assigned UE radio capability ID for which the PLMN uses a manufacturer-assigned UE radio capability ID.

The UE may determine to operate according to reduced capability for a period of time (e.g., when the UE detects thermal conditions) (2526). Thus, the UE may send a registration request to AMF with NG-RAN RCU flag enabled in "5GS update type" IE (2528). This message may inform the network that UE wants to change its UE radio capability ID, e.g., to one of the IDs of the set of UE radio capability IDs. For example, the UE may compare its temporary capabilities to the capabilities of the set of UE radio capability IDs and may select a temporary ID best matching its temporary capabilities. The UE may indicate the selected temporary UE radio capability ID to the network. In some embodiments, the UE may further provide the restricted/reduced capability information in addition to (or instead of) the selected ID.

The AMF may enquire with the UCMF to confirm that the UE capability information is present in its dictionary (2530), e.g., associated with the temporary ID. The UCMF may retrieve the corresponding UE radio capability ID and provide it to the AMF via the Nucmf_UECapabilityManagement (Resolve) service (2532).

The AMF may accept the registration (2534) and may confirm that the selected temporary UE radio capability ID for the new UE capability information is valid. The UE may continue to communicate with the network using the temporary reduced capability and the temporary ID.

The remainder of FIG. 22 may proceed as described above with respect to FIG. 20. The UE may determine to operate at full capability (2136) and re-register (2138). Further, the AMF may inform the UCMF (2140, 2142) (not shown). Further, the AMF may accept the registration (2144). The UE may communicate with the network according to full capability.

It will be appreciated that FIG. 22 may refer to manufacturer-assigned and/or PLMN-assigned UE radio capability IDs.

Figure 23:
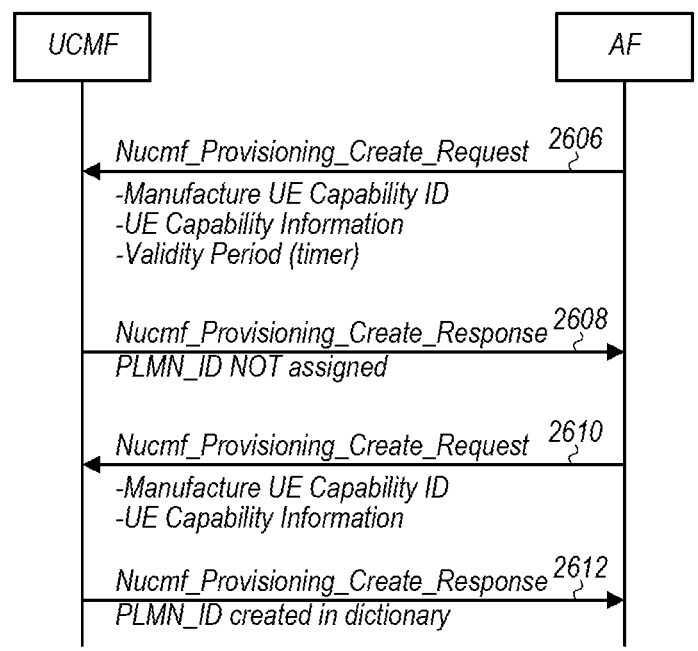

FIG. 23 is a call flow diagram illustrating example aspects of the method of FIG. 19, according to some embodiments.

As shown, an AF may transmit a Nucmf_Provisioning_Create_Request to the UCMF (e.g., using the N57 interface) to create a set of UE radio capability IDs (2606, 2610)). The request may be a single request (e.g., for a plurality of IDs) or may be multiple requests (e.g., one request per ID). For example, in the case of a single request, the AF may add multiple different UE capability information descriptions and corresponding manufacturer-assigned IDs. The AF may provide a manufacturer-assigned UE radio capability ID, e.g., for each requested PLMN-assigned UE radio capability ID. In some embodiments, a manufacturer-assigned UE radio capability ID may be used as (e.g., may be the same as a corresponding) PLMN-assigned UE radio capability ID. The AF may provide UE capability information, e.g., for each UE radio capability ID.

In some embodiments, the AF may provide a validity period (e.g., duration of a timer) associated with each UE radio capability ID (e.g., as shown in 2606). In some embodiments, the validity period may be different for each UE radio capability ID. The validity period may depend on the type of conditions under which each UE radio capability ID may be used. In some embodiments, the validity may be the same for two or more UE radio capability IDs, e.g., all UE radio capability IDs may have the same validity period, e.g., a standard validity period. In some embodiments, if a manufacturer-assigned UE radio capability ID is associated with a validity timer, the UCMF may not assign a PLMN-assigned UE radio capability ID to the corresponding capabilities.

The UCMF may respond with a Nucmf_Provisioning_Create_Response (2608, 2612). In response to a request that includes a validity timer (2606), the response may indicate that no PLMN-assigned UE radio capability ID is assigned (2608). In response to a request that does not include a validity timer (2610), the response may indicate that a dictionary entry and a corresponding PLMN-assigned UE radio capability ID is created (2612).

Additional Information and Examples

In some embodiments, during the initial registration procedure, the network may provide the UE with various PLMN-assigned UE radio capability IDs, e.g., similar to those listed above. The network may also provide descriptions of the capabilities associated with each ID, e.g., as discussed above. Thus, the UE and the network may share a list of potential UE radio capability IDs for the UE and the capabilities associated with each UE radio capability ID.

It will be appreciated that various messages are described as being between a UE (or UEs) and various network elements. It will be appreciated that such messages may be transferred through the RAN (e.g., a BS 102) and/or other elements of the network. For example, to transmit an uplink message "to" the AMF (or any other network element), a UE may send the message to a BS 102, which may relay the message (e.g., potentially through one or more intermediate network elements) to the AMF (or other network element). Similarly, downlink messages to a UE may be relayed from an element of the core network (or a manufacturer server 109) through any number of network elements to a BS 102 for transmission to the UE.

In a first set of embodiments, a method for operating a server associated with a user equipment device (UE) manufacturer may comprise: at the server: receiving an updated UE radio configuration; creating a UE radio capability identifier (ID) based on the updated UE radio configuration; transmitting the UE radio capability ID to a cellular network; and transmitting the updated UE radio configuration to a plurality of UEs operating on the cellular network.

In some embodiments, the UE radio capability ID may be further based on a type allocation code and software version number, wherein the updated UE radio configuration does not change the software version number.

In some embodiments, the UE radio capability ID may be further based on a model ID and a software version number, wherein the model ID identifies a UE model of the UE, wherein the updated UE radio configuration does not change the software version number.

In some embodiments, an opcode may be used to describe the updated UE radio configuration.

In a second set of embodiments, a method for operating a server of a user equipment device (UE) manufacturer, may comprise: at the server: receiving a forced capability update; transmitting, to a network element of a cellular network, information about the capability update, wherein the information includes a manufacturer-assigned UE radio capability identifier (ID); receiving, from the network element, a confirmation in response to the information; and in response to receiving the confirmation, transmitting, to a plurality of UEs operating on the cellular network, the forced capability update and a second UE radio capability ID associated with the capability update.

In some embodiments, transmitting the forced capability update may include transmitting an indication to the plurality of UEs to delete a previous UE radio capability ID.

In some embodiments, the confirmation may be an indication that a plurality of other network elements have received the information about the capability update.

In some embodiments, the manufacturer-assigned UE radio capability ID may be based on the forced capability update.

In some embodiments, the forced capability update does not update a software version number, wherein the manufacturer-assigned UE radio capability ID is further based on the software version number.

In some embodiments, the second UE radio capability ID may be the manufacturer-assigned UE radio capability ID.

In some embodiments, the second UE radio capability ID may be PLMN-assigned and corresponds to the manufacturer-assigned UE radio capability ID.

In a third set of embodiments, an apparatus for operating a network element of a cellular network, may comprise: a processor configured to cause the network element to: receive a message about a registration request of a first user equipment device (UE) of a first model; determine a first UE radio capability identifier (ID) for UEs of the first model; receive information related to a capability update for UEs of the first model; determine a second UE radio capability ID for UEs of the first model based on the capability update, wherein the second UE radio capability ID is different from the first UE radio capability ID; receive a second message about a second registration request of a second UE of the first model; cause a base station of the cellular network to communicate with the first UE according to capabilities associated with the first UE radio capability ID; and cause the base station of the cellular network to communicate with the second UE according to capabilities associated with the second UE radio capability ID.

In some embodiments, the processor may be further configured to cause the network element to: determine that the first UE has not implemented the capability update; and determine that the second UE has implemented the capability update.

In some embodiments, the second message may include the second UE radio capability ID, wherein the determination that the second UE has implemented the capability update is based on the second message including the second UE radio capability ID.

In some embodiments, the processor may be further configured to cause the network element to: at a later time: receive a third massage about a re-registration request of the first UE, wherein the third message includes the second UE radio capability ID; determine that the first UE has implemented the capability update, wherein the determination that the first UE has implemented the capability update is based on the third message including the second UE radio capability ID; and cause the base station of the cellular network to communicate with the first UE according to capabilities associated with the second UE radio capability ID.

In some embodiments, the capabilities associated with the second UE radio capability ID may be based on the capability update, wherein the capabilities associated with the first UE radio capability ID are not based on the capability update.

In a fourth set of embodiments, a user equipment device (UE), may comprise: a radio; and a processor operably connected to the radio and configured to cause the UE to: register with a base station of a cellular network using an initial UE radio capability ID; communicate with the base station at a full capability according to the initial UE radio capability ID; determine to operate at a reduced capability on a temporary basis; select a second UE radio capability ID according to the reduced capability; re-register, with the base station, using the second UE radio capability ID; communicate with the base station at the reduced capability according to the second UE radio capability ID; determine to resume operation at the full capability; and in response to the determination to resume operation at the full capability, revert to the initial UE radio capability ID.

In some embodiments, the processor may be further configured to cause the UE to: transmit an information element describing a validity timer associated with the second UE radio capability UE.

In some embodiments, the determination to resume operation at the full capability may be based on expiration of the validity timer.

In some embodiments, to revert to the initial UE radio capability ID does not include re-registration with the base station using the initial UE radio capability ID.

In some embodiments, the determination to resume operation at the full capability may be based on a change in conditions at the UE prior to expiration of the validity timer.

In some embodiments, the determination to operate at the reduced capability on the temporary basis may be based on a temperature at a component of the UE reaching a temperature threshold.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
at an Access and Mobility Management Function:
receiving a first UE radio capability identifier (ID) from a user equipment (UE) corresponding to a first version number;
transmitting the first UE radio capability ID to a UE radio Capability Management Function (UCMF);
receiving an updated UE radio capability ID based on an updated UE radio configuration from the UCMF corresponding to a second version number previously stored at the UCMF, wherein the updated UE radio capability ID is a public land mobile network (PLMN) assigned UE radio capability ID and is assigned by the UCMF; and transmitting the updated UE radio capability ID to the UE through a cellular network.

2. The method of claim 1, wherein the updated UE radio capability ID further includes an identifier associated with a capability update of the second version number.

3. The method of claim 2, wherein the updated UE radio configuration does not change a software version number.

4. The method of claim 1, wherein an opcode is used to describe the updated UE radio configuration.

5. The method of claim 1, wherein the first UE radio capability ID is further based on an identification of a manufacturer.

6. The method of claim 1, wherein the updated UE radio capability ID is further based on an identification of a manufacturer.

7. An apparatus, comprising:
a processor configured to cause a user equipment device (UE) to:
register with a base station of a cellular network using an initial UE radio capability ID;
communicate with the base station at a full capability according to the initial UE radio capability ID;
determine to operate at a reduced capability on a temporary basis;
select a second UE radio capability ID according to the reduced capability;
re-register, with the base station, using the second UE radio capability ID;
communicate with the base station at the reduced capability according to the second UE radio capability ID;
determine to resume operation at the full capability; and
in response to the determination to resume operation at the full capability, revert to the initial UE radio capability ID.

8. The apparatus of claim 7, wherein the processor is further configured to cause the UE to:
transmit an information element describing a validity timer associated with the second UE radio capability UE.

9. The apparatus of claim 8, wherein the determination to resume operation at the full capability is based on expiration of the validity timer.

10. The apparatus of claim 9, wherein to revert to the initial UE radio capability ID does not include re-registration with the base station using the initial UE radio capability ID.

11. The apparatus of claim 8, wherein the determination to resume operation at the full capability is based on a change in conditions at the UE prior to expiration of the validity timer.

12. The apparatus of claim 7, wherein the determination to operate at the reduced capability on the temporary basis is based on a temperature at a component of the UE reaching a temperature threshold.

13. The apparatus of claim 7, wherein the initial UE radio capability ID is assigned by a public land mobile network (PLMN).

14. The apparatus of claim 13, wherein the second UE radio capability ID is assigned by a manufacturer of the UE.

15. An apparatus, comprising:
a processor configured to cause a base station to:
receive a first UE radio capability identifier (ID) from a user equipment (UE) corresponding to a first version number;
transmit the first UE radio capability ID to a core network;
receive, from the core network, an updated UE radio capability ID based on an updated UE radio configuration corresponding to a second version number previously stored at the core network, wherein the updated UE radio capability ID is a public land mobile network (PLMN) assigned UE radio capability ID and is assigned by the core network; and
transmit the updated UE radio capability ID to the UE.

16. The apparatus of claim 15, wherein the updated UE radio capability ID further includes an identifier associated with a capability update of the second version number.

17. The apparatus of claim 16, wherein the updated UE radio configuration does not change a software version number.

18. The apparatus of claim 15, wherein an opcode is used to describe the updated UE radio configuration.

19. The apparatus of claim 15, wherein the first UE radio capability ID is further based on an identification of a manufacturer.

20. The apparatus of claim 15, wherein the updated UE radio capability ID is further based on an identification of a manufacturer.

* * * * *